United States Patent
Tachibana

(10) Patent No.: US 10,414,619 B2
(45) Date of Patent: Sep. 17, 2019

(54) PRINTING APPARATUS, METHOD OF CONTROLLING THE SAME, AND STORAGE MEDIUM

(71) Applicant: CANON KABUSHIKI KAISHA, Tokyo (JP)

(72) Inventor: Yoshiro Tachibana, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/724,946

(22) Filed: May 29, 2015

(65) Prior Publication Data

US 2015/0344257 A1 Dec. 3, 2015

(30) Foreign Application Priority Data

May 30, 2014 (JP) .................. 2014-113346

(51) Int. Cl.
*G06K 15/00* (2006.01)
*B31F 5/02* (2006.01)
(Continued)

(52) U.S. Cl.
CPC ......... *B65H 37/04* (2013.01); *G03G 15/6544* (2013.01); *G06F 3/1204* (2013.01);
(Continued)

(58) Field of Classification Search
CPC ...... G03G 15/6544; B65H 2301/43828; B65H 2408/40; B65H 2301/43821; B31F 5/02; G06K 15/403
See application file for complete search history.

(56) References Cited

U.S. PATENT DOCUMENTS 6,154,286 A * 11/2000 Konno ................. G03G 15/221
358/1.13
8,235,375 B2   8/2012 Shiraishi
(Continued)

FOREIGN PATENT DOCUMENTS

CN    102207698 A    10/2011
CN    103287118 A    9/2013
(Continued)

OTHER PUBLICATIONS

Office Action issued in Chinese Appln. No. 201510262619.4, dated Sep. 20, 2016. English translation provided.
(Continued)

*Primary Examiner* — Jennifer E Simmons
(74) *Attorney, Agent, or Firm* — Rossi, Kimms & McDowell LLP

(57) ABSTRACT

A printing apparatus has a first binding unit for performing a binding process at any one of plural positions and a second binding unit for performing a binding process at a single position and prints images based on image data on sheets. If the binding process is performed using the first binding unit, the printing apparatus prints images on sheets according to the input order of the image data. If the binding process is performed using the second binding unit, the printing apparatus prints images on sheets according to the input order of the image data, or prints the images according to an order reversed from the input order of the image data, based on the orientation of the images of the image data, the single position and the orientation of the sheets used for printing.

16 Claims, 38 Drawing Sheets

(51) Int. Cl.
*G03G 15/00* (2006.01)
*B65H 37/04* (2006.01)
*G06F 3/12* (2006.01)

(52) U.S. Cl.
CPC .......... *G06F 3/1264* (2013.01); *G06F 3/1285* (2013.01); *G06K 15/403* (2013.01); *B65H 2301/43821* (2013.01); *B65H 2801/27* (2013.01); *G03G 2215/0487* (2013.01)

(56) References Cited

U.S. PATENT DOCUMENTS

| 8,814,156 | B2 | 8/2014 | Hattori |
| 9,016,680 | B2 | 4/2015 | Mutsuno |
| 2013/0214471 | A1* | 8/2013 | Yabe ................... B65H 39/00 270/1.01 |
| 2013/0214472 | A1 | 8/2013 | Suzuki |
| 2013/0336746 | A1 | 12/2013 | Kizaki et al. |

FOREIGN PATENT DOCUMENTS

| CN | 103420205 A | 12/2013 |
| CN | 103482402 A | 1/2014 |
| JP | 2004167700 A | 6/2004 |
| JP | 2011209460 A | 10/2011 |
| JP | 2014113346 A | 6/2014 |

OTHER PUBLICATIONS

Office Action issued in Japanese Appln. No. 2014-113346 dated Feb. 26, 2018.
Office Action issued in Japanese Appln. No. 2018-135209 dated Jun. 3, 2019.

* cited by examiner

F I G. 4A
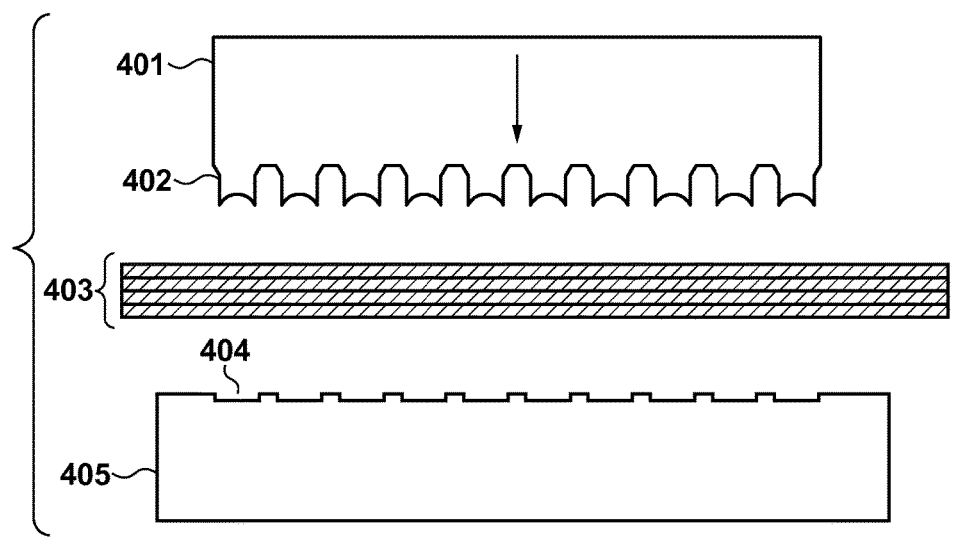
F I G. 4B
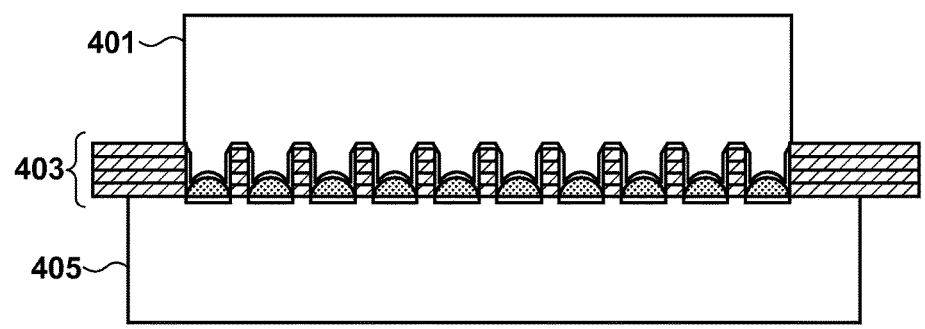
F I G. 4C

F I G. 8E
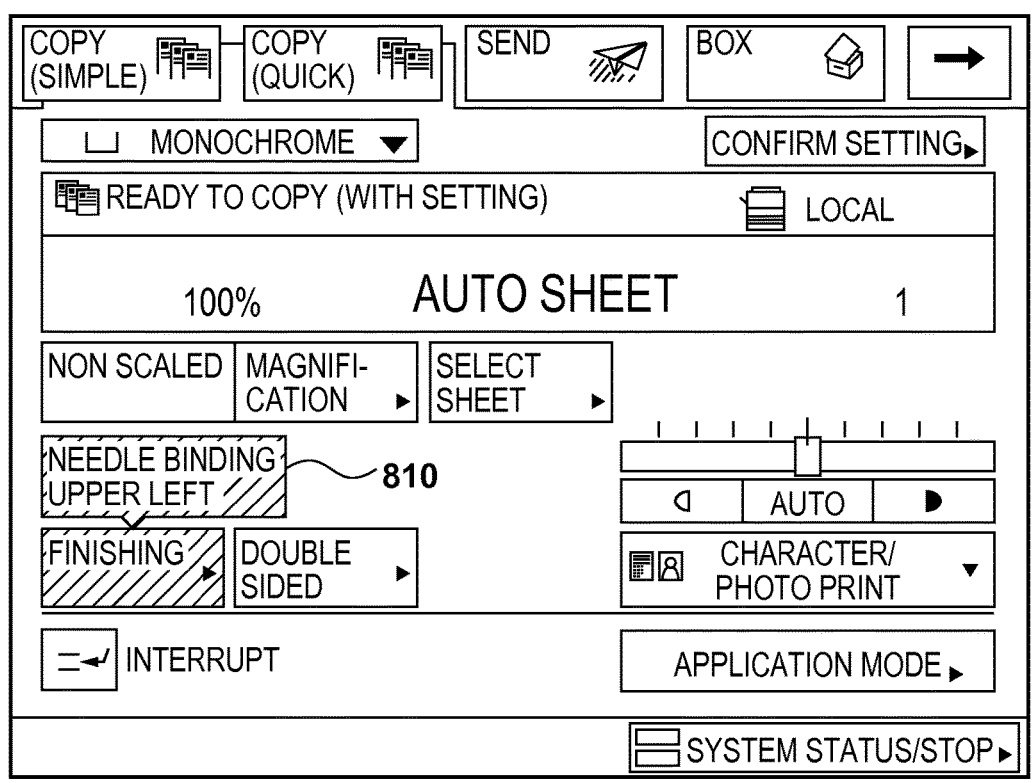

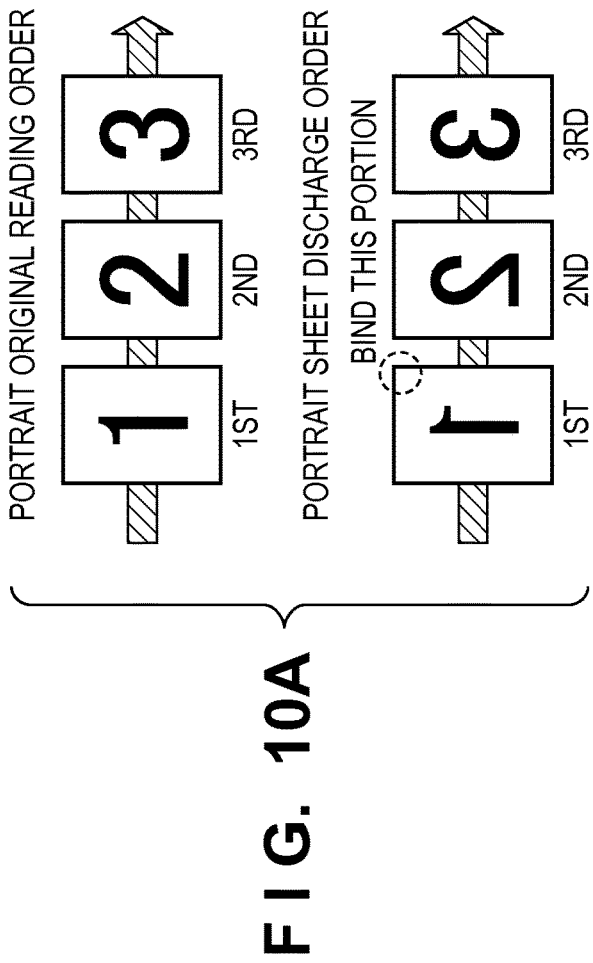
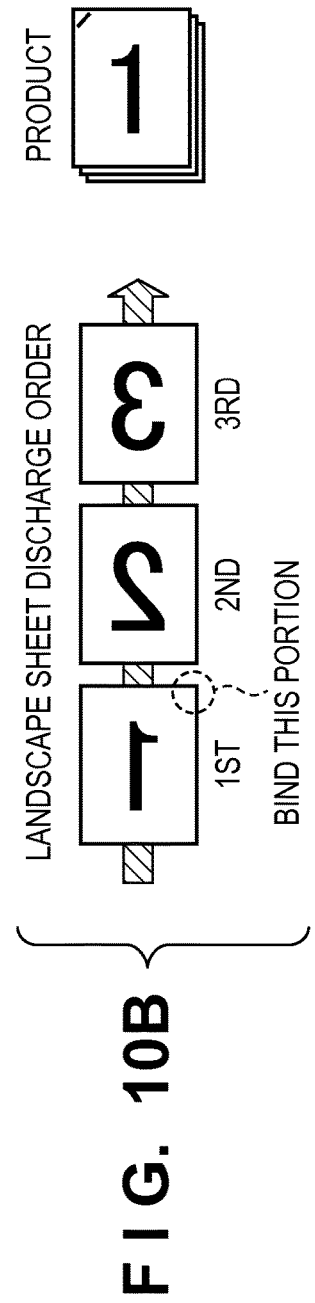
FIG. 10A
FIG. 10B

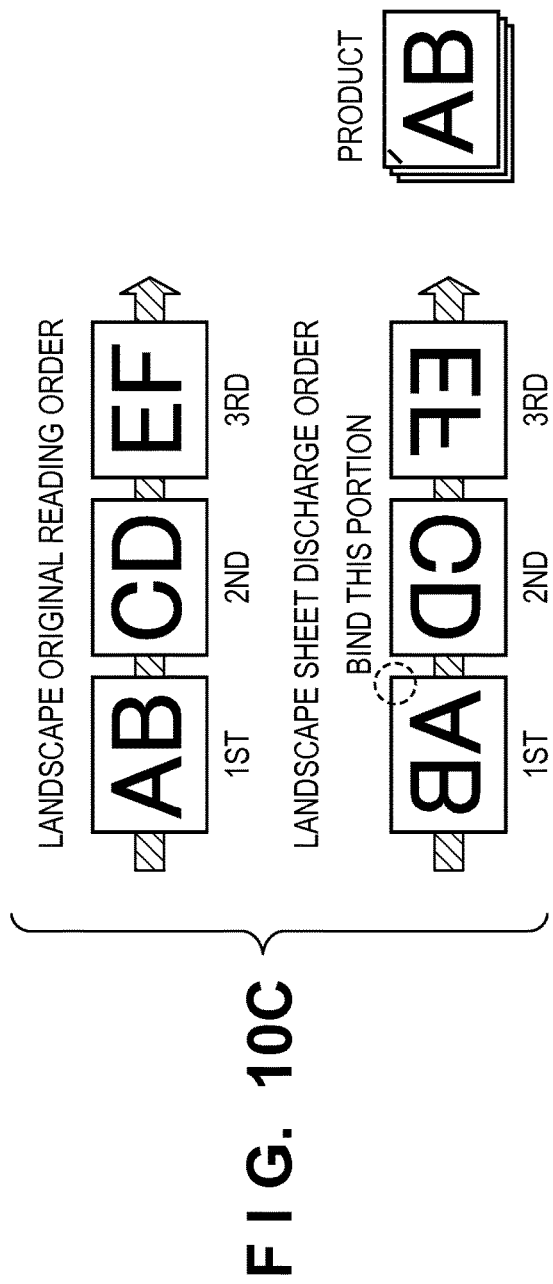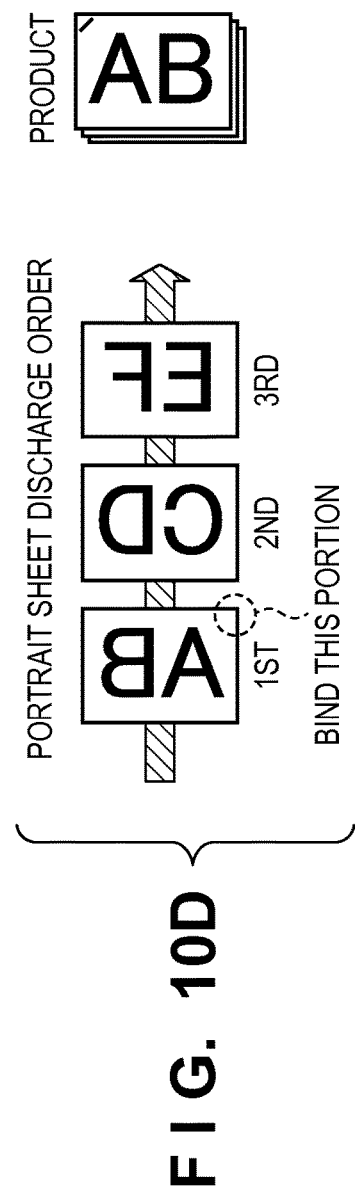
FIG. 10C
FIG. 10D

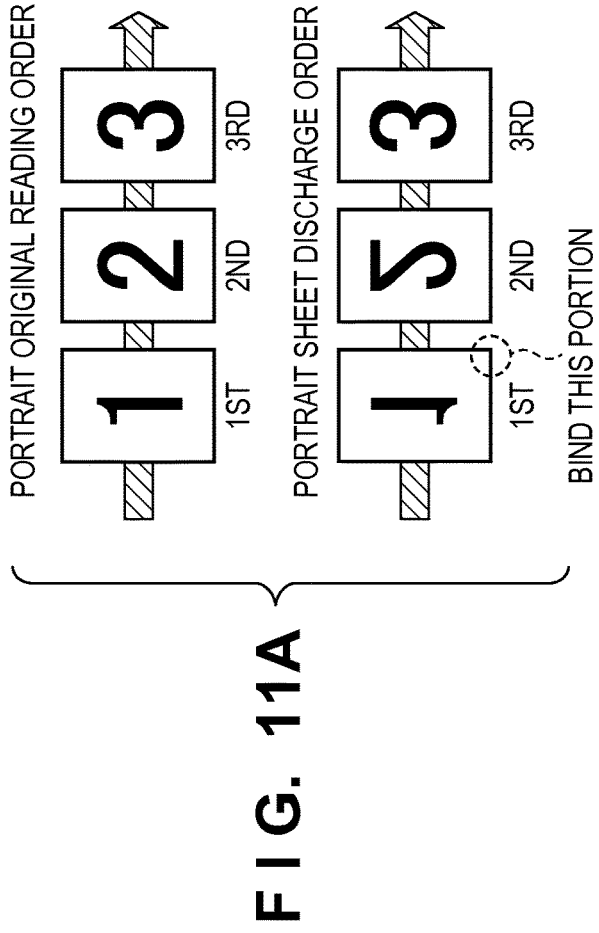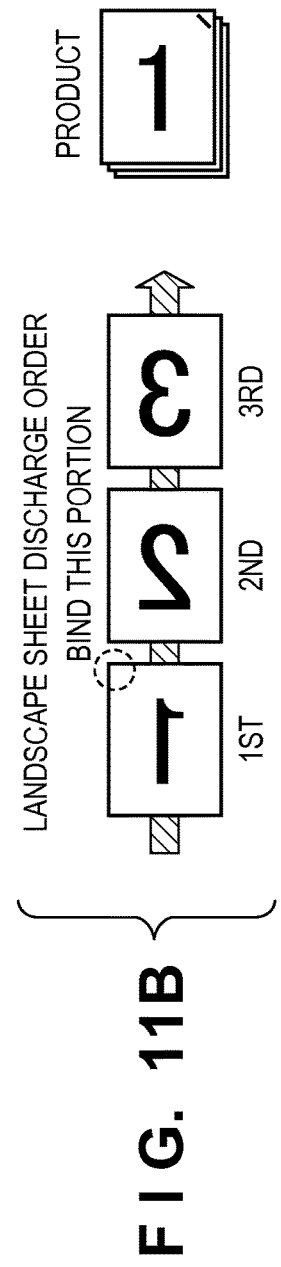
FIG. 11A
FIG. 11B

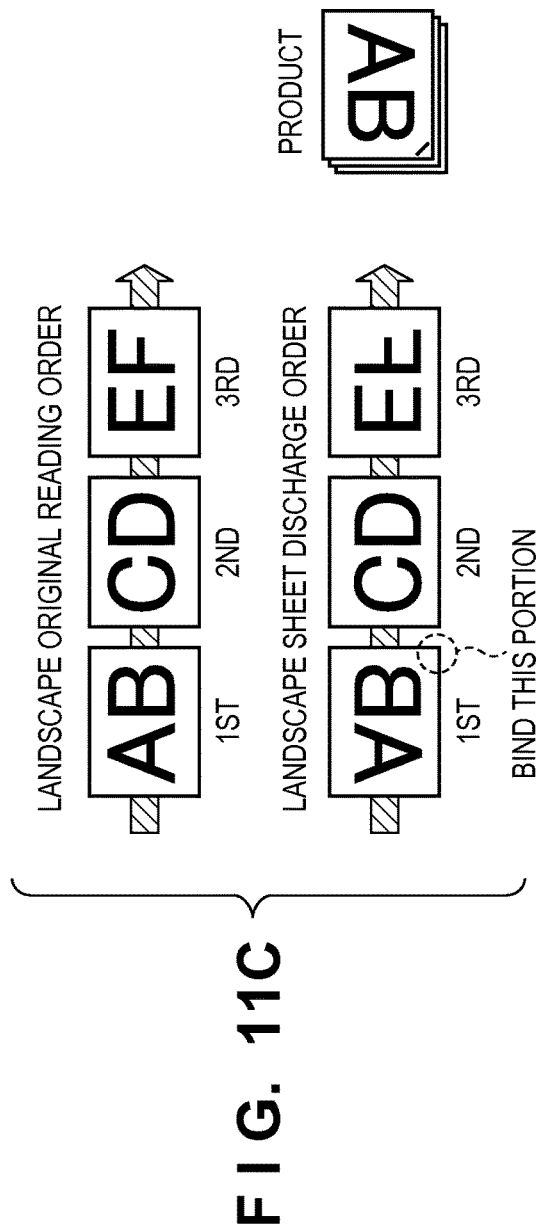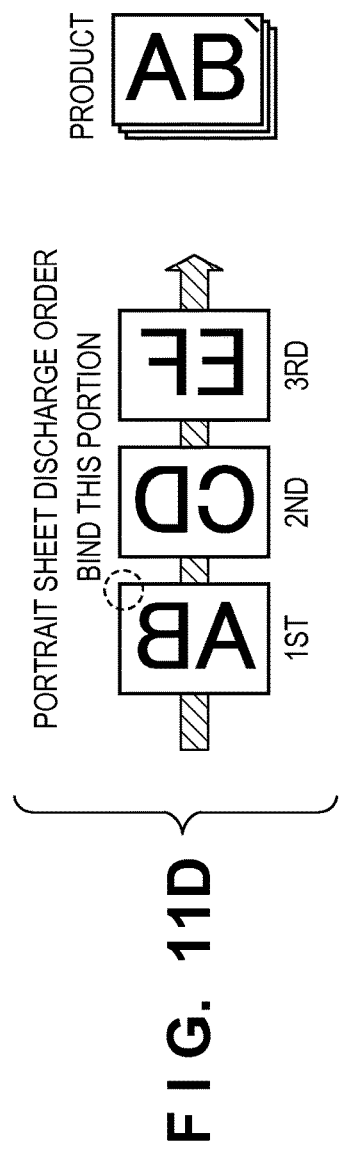

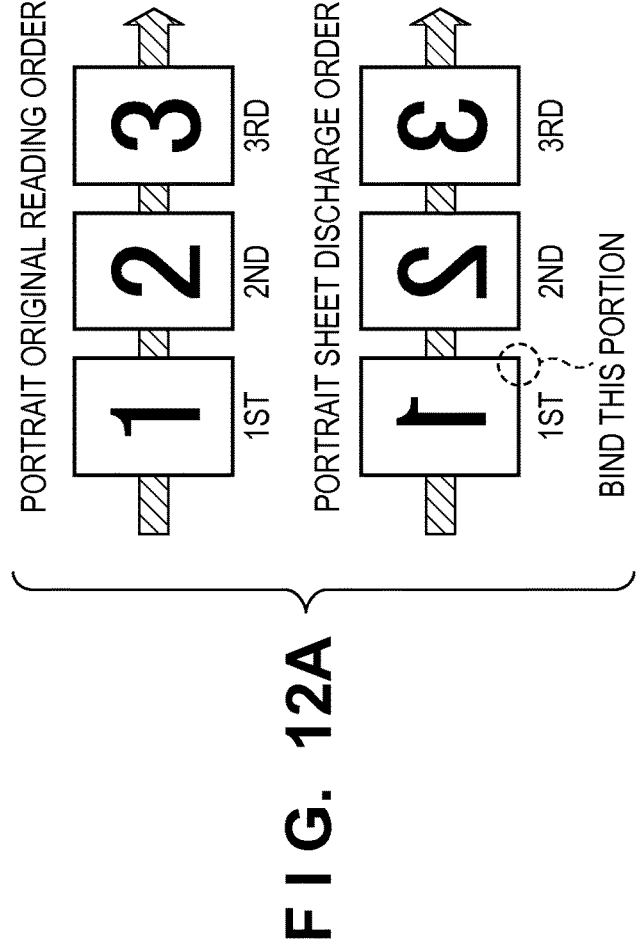
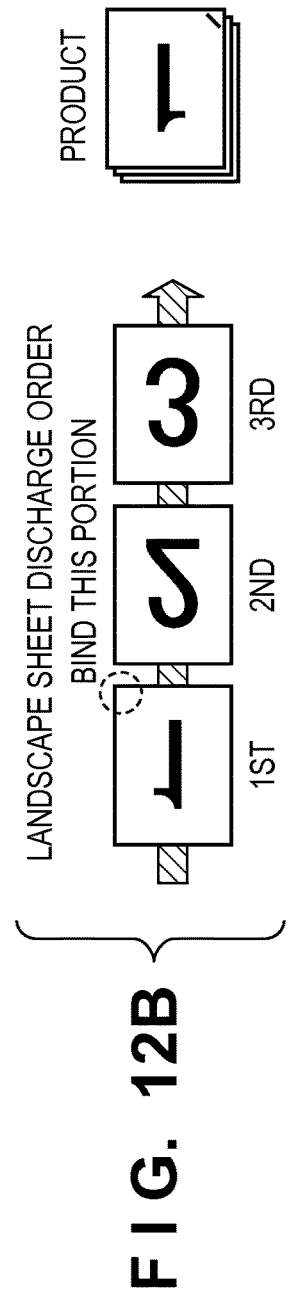
FIG. 12A
FIG. 12B

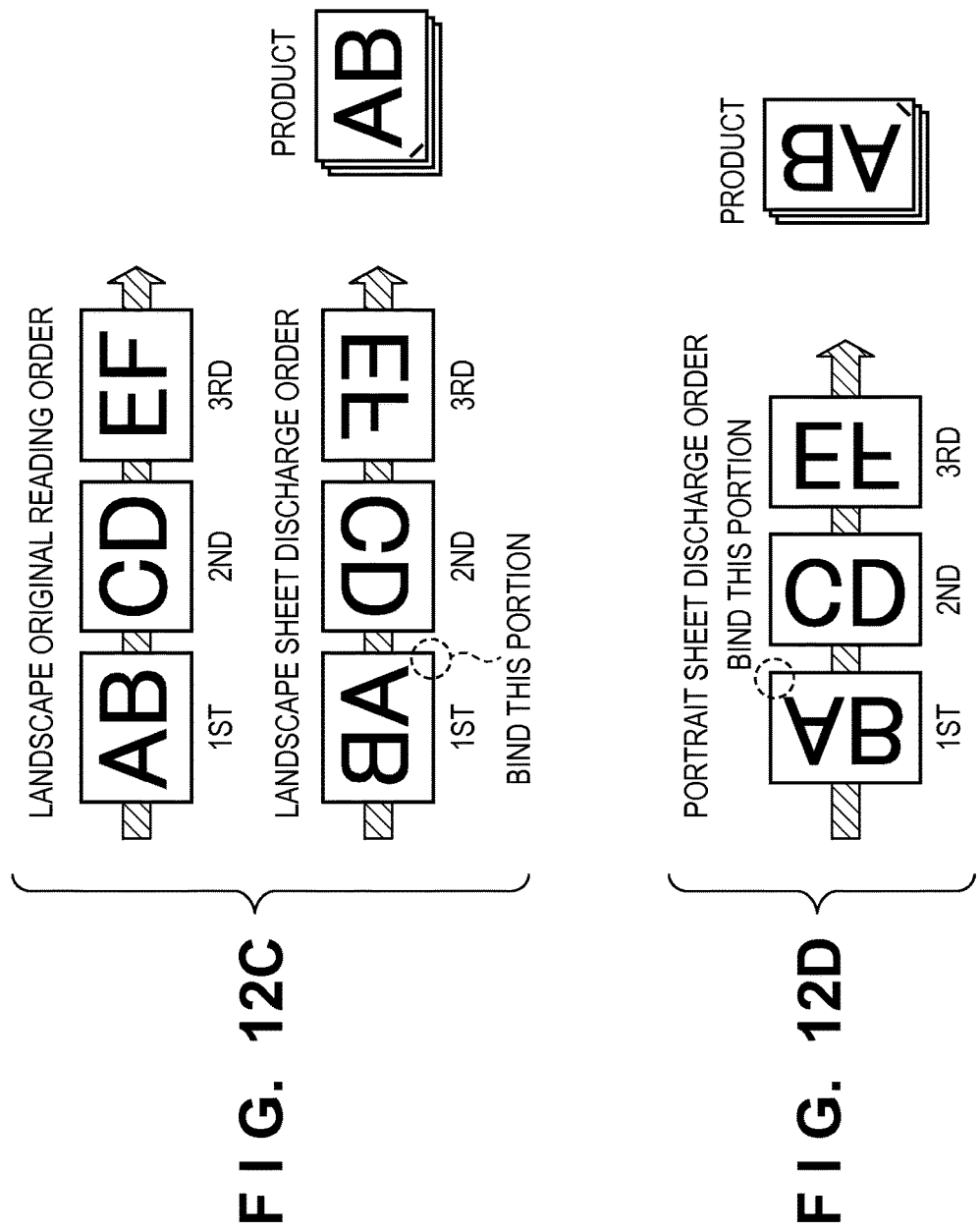

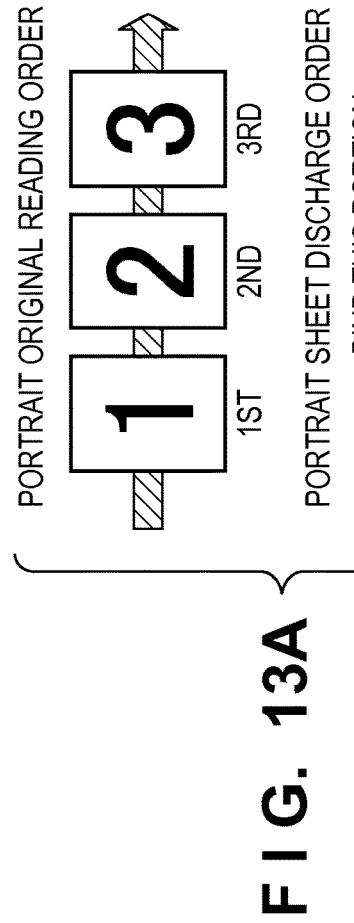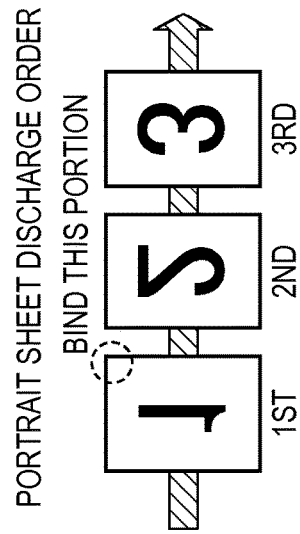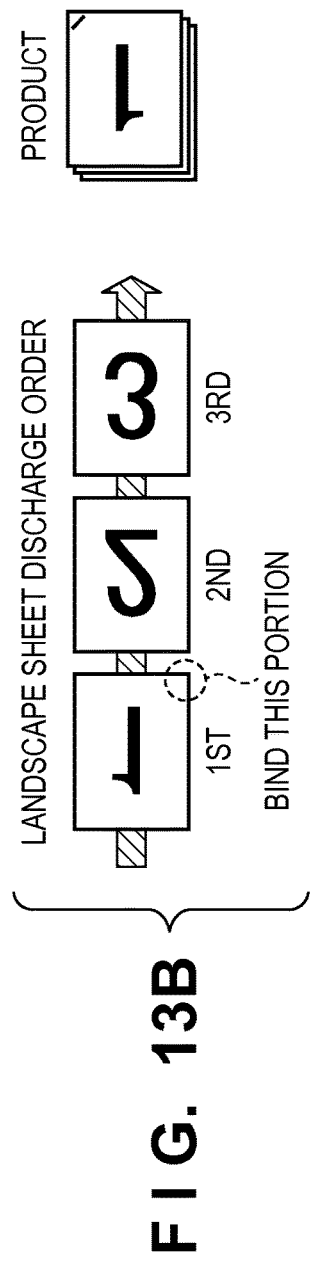

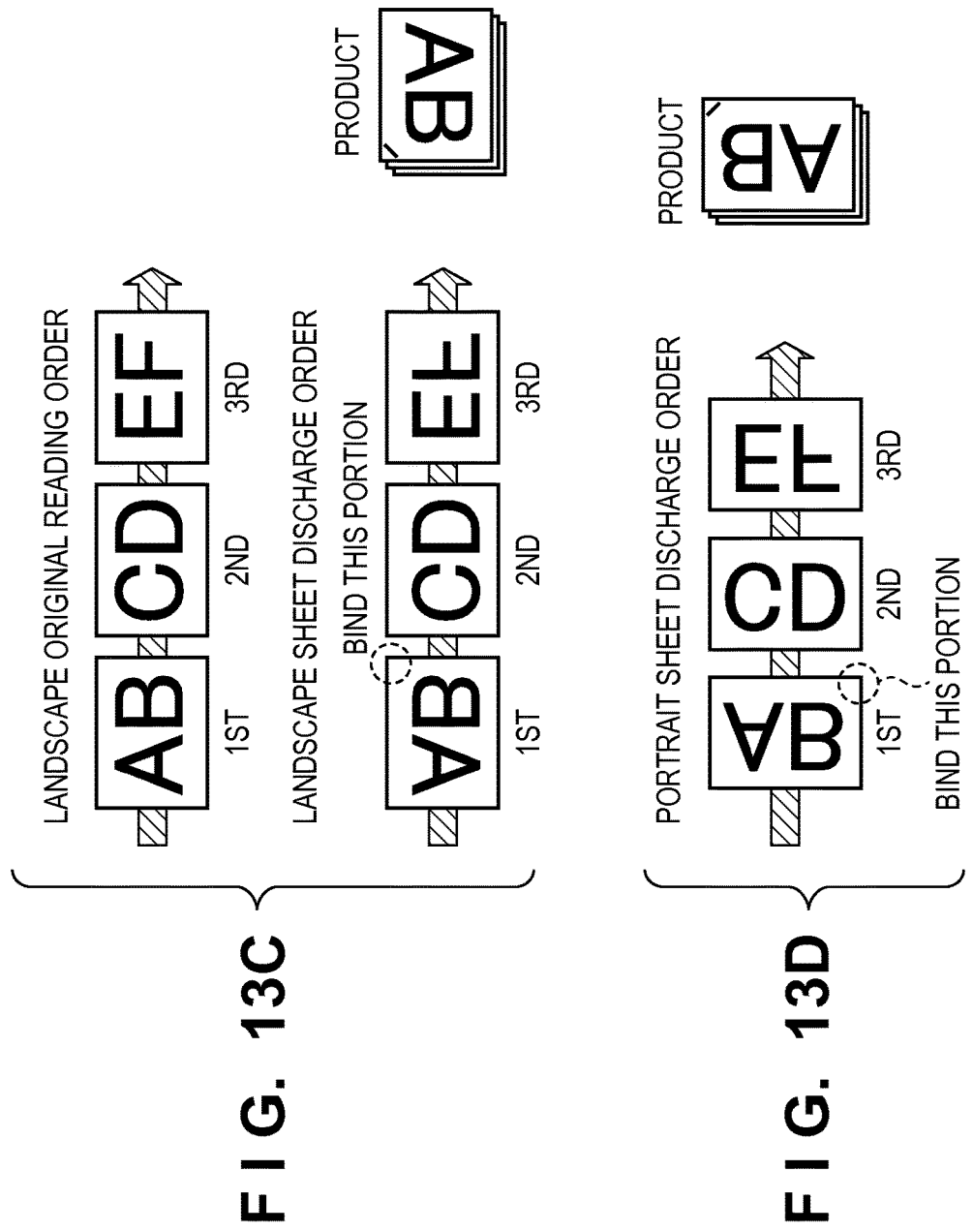

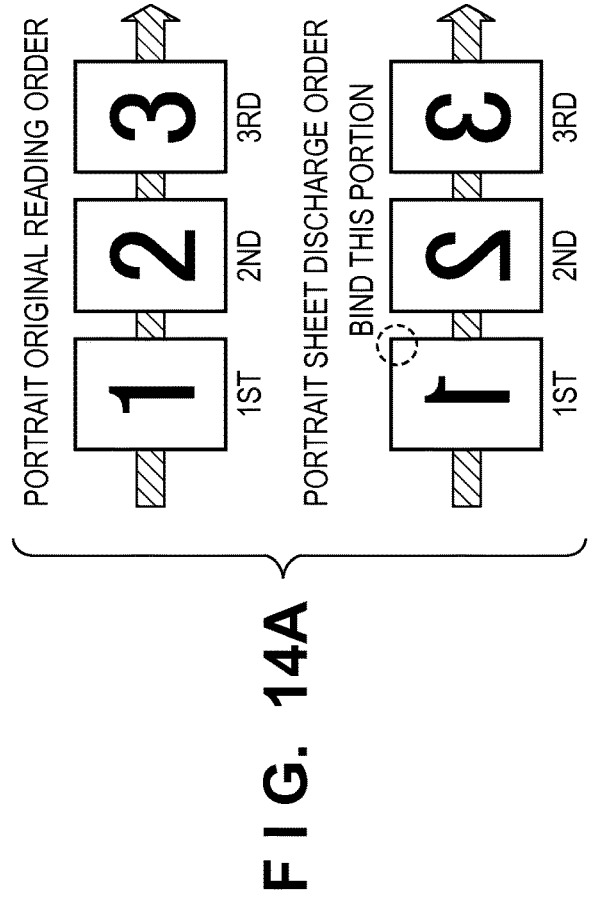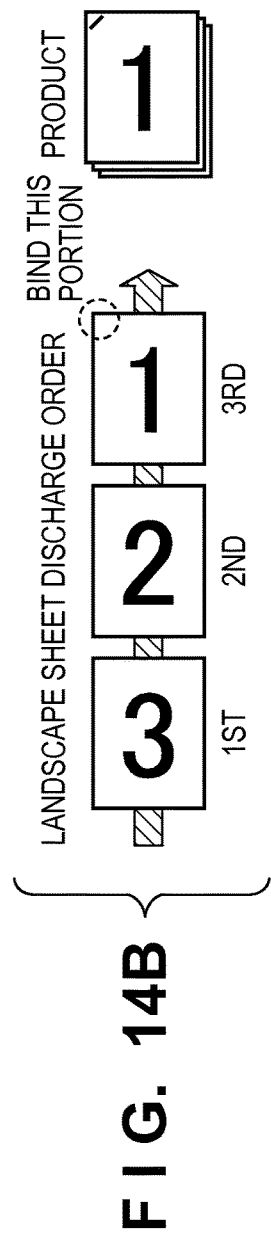
FIG. 14A
FIG. 14B

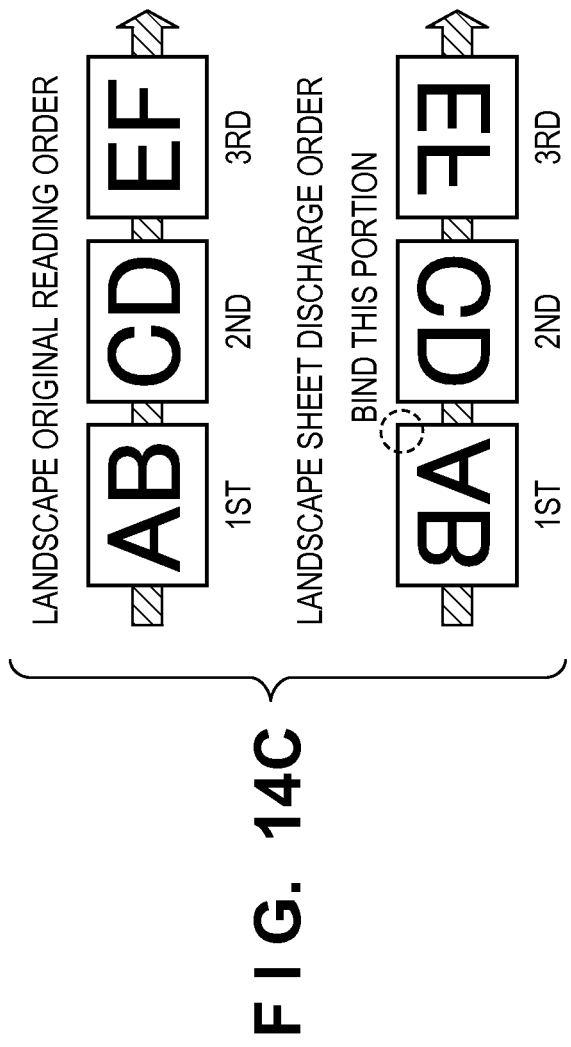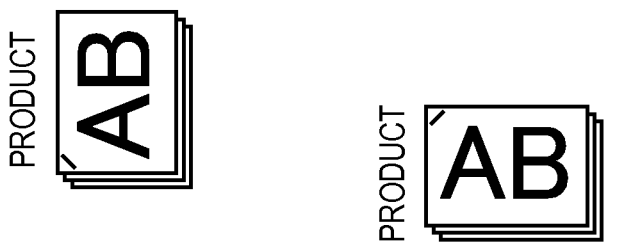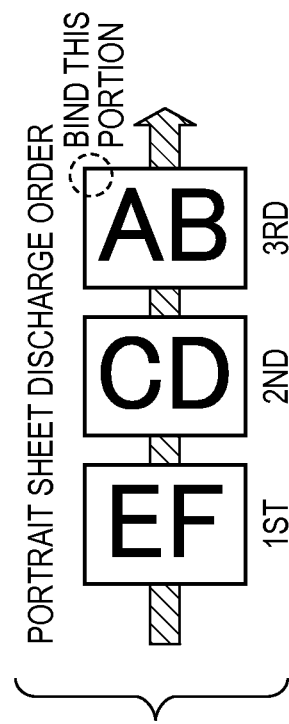
FIG. 14C
FIG. 14D

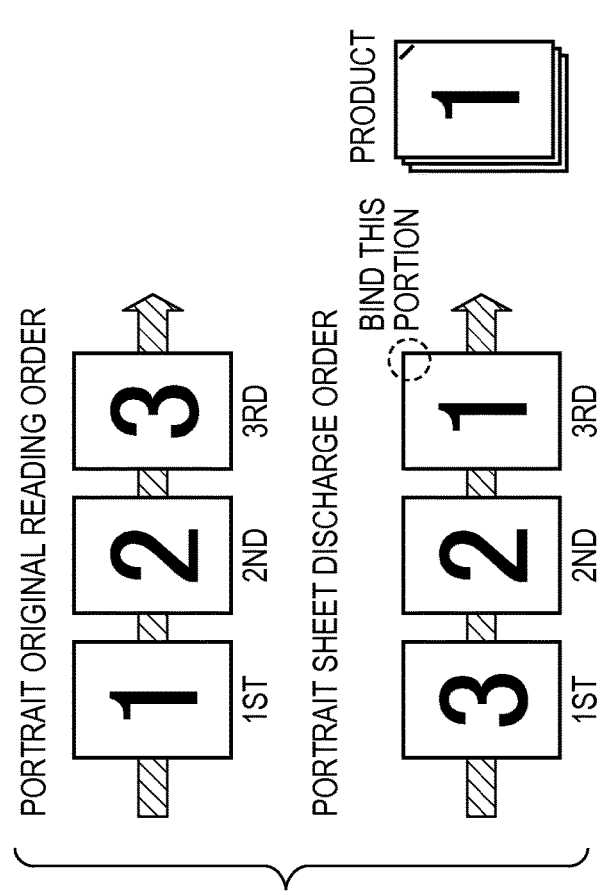
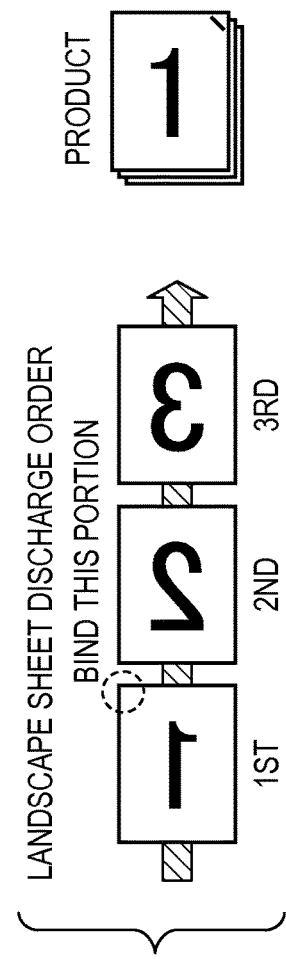
FIG. 15A
FIG. 15B

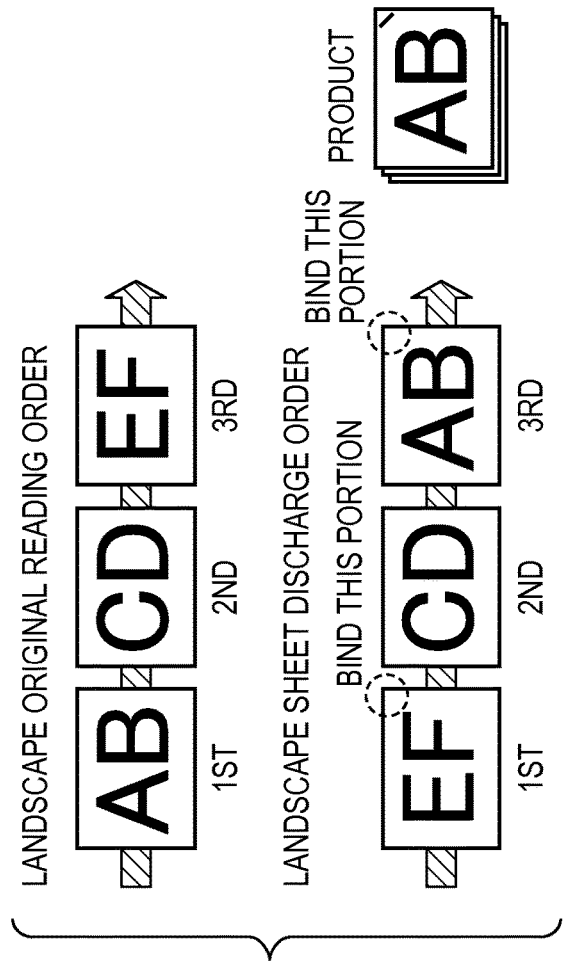
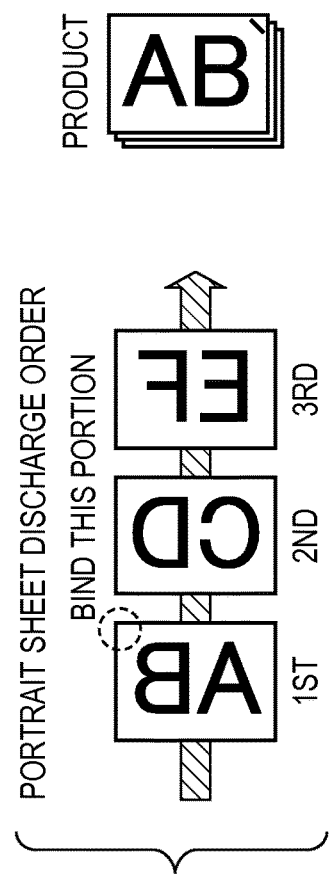
FIG. 15C
FIG. 15D

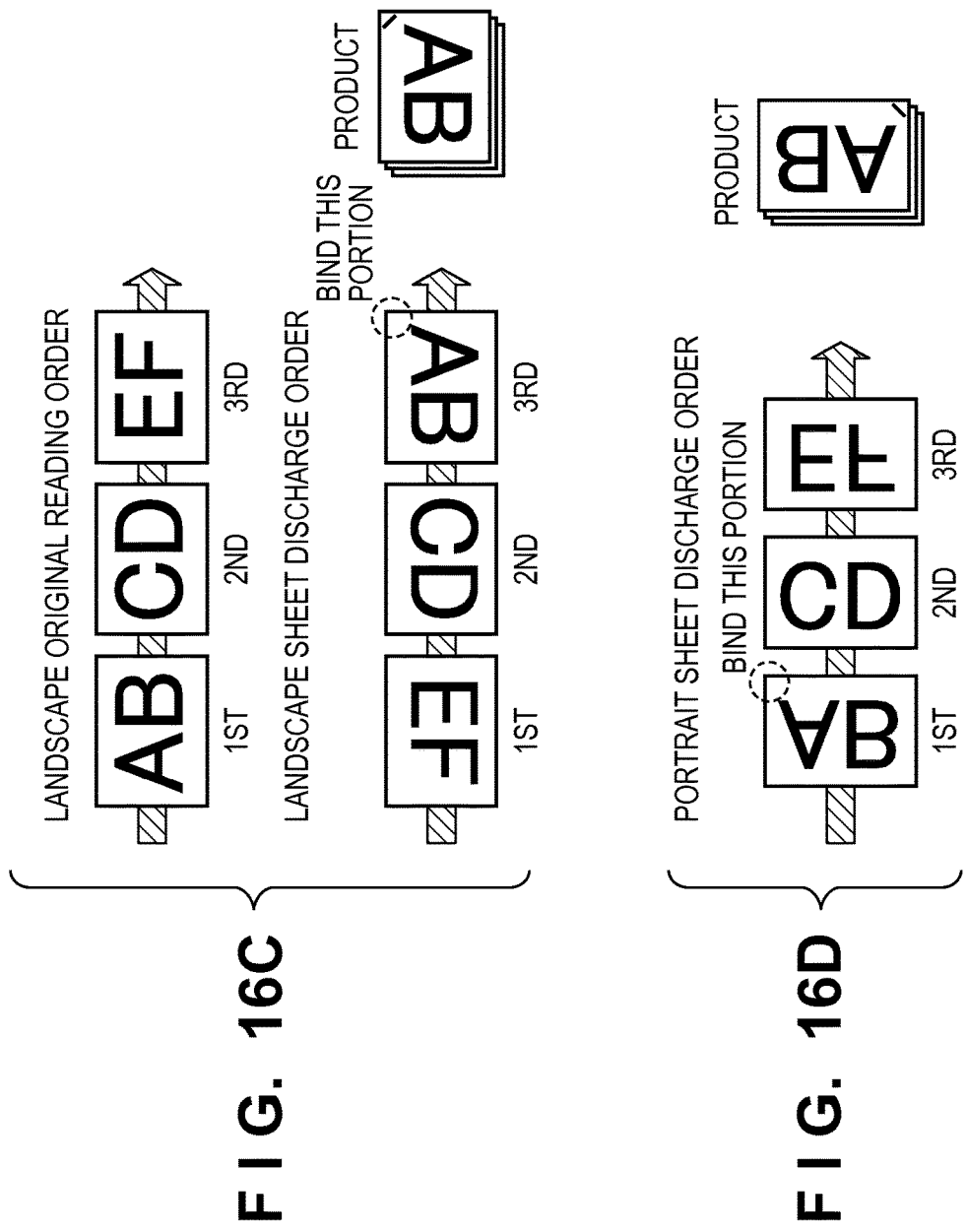

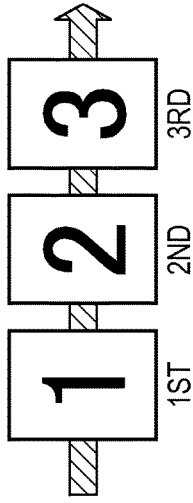
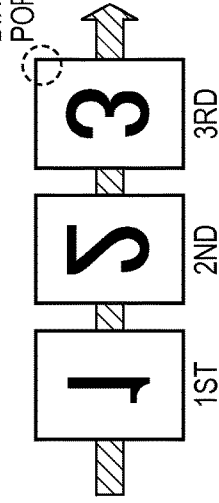
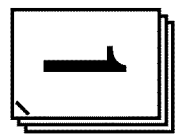
FIG. 17A
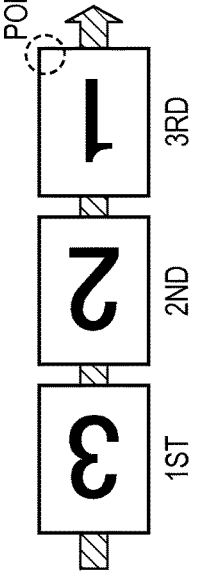
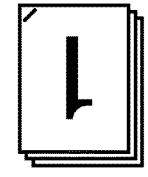
FIG. 17B

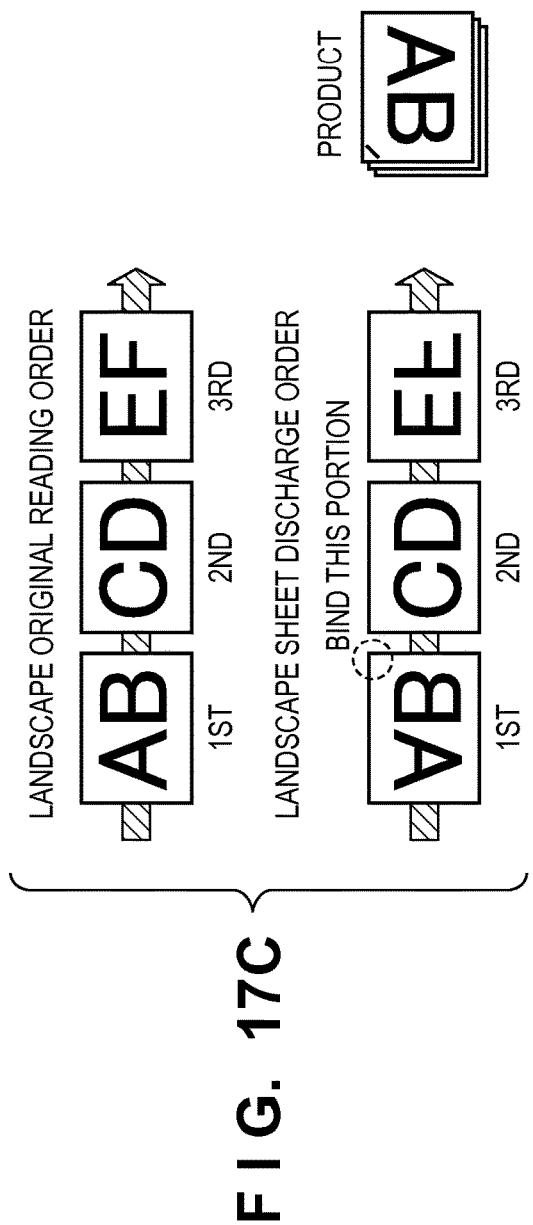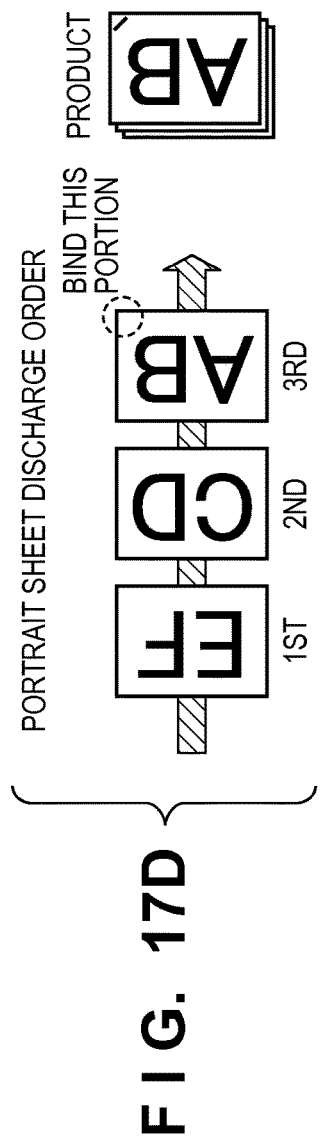
FIG. 17C
FIG. 17D

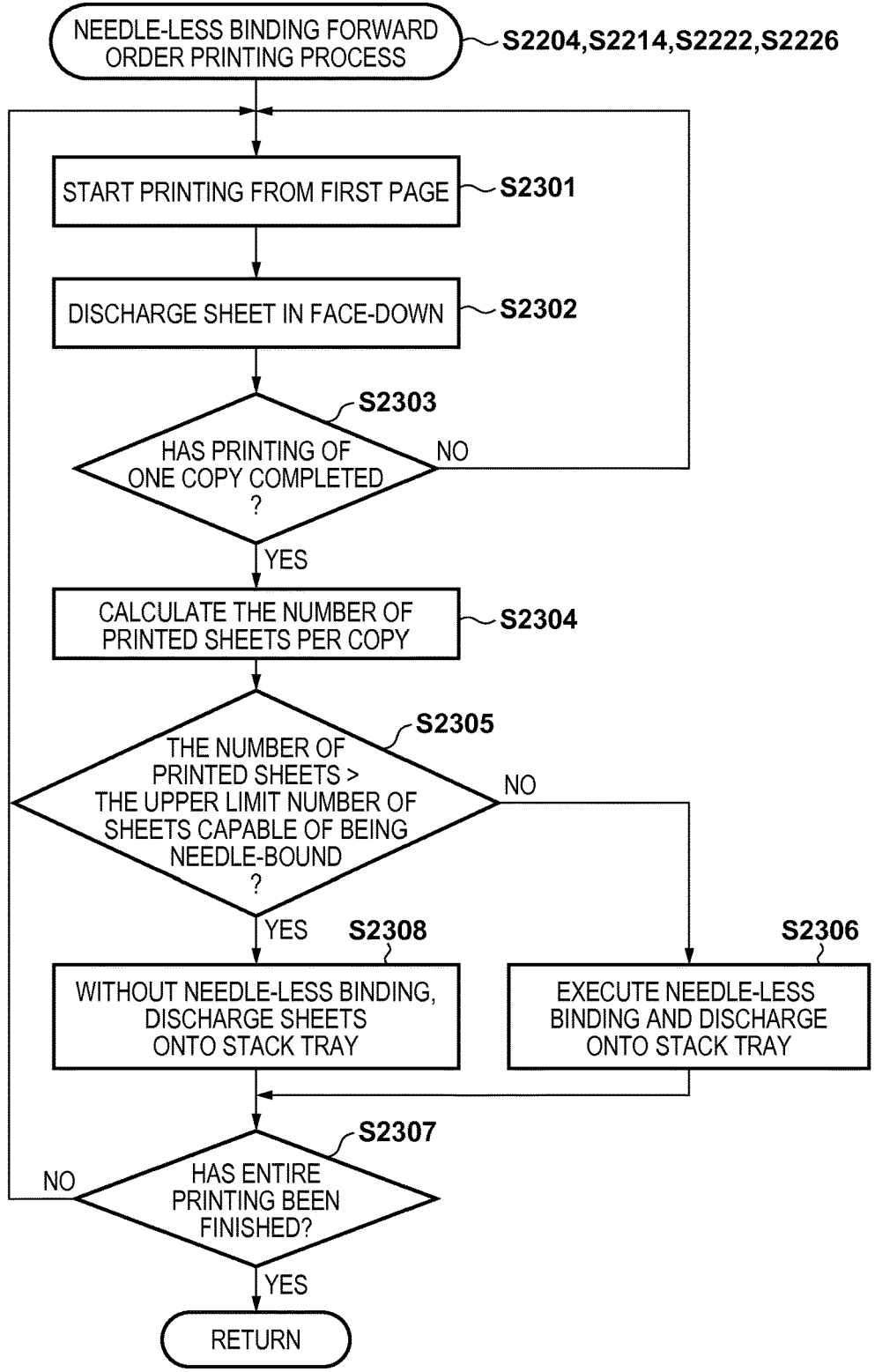

PRINTING APPARATUS, METHOD OF CONTROLLING THE SAME, AND STORAGE MEDIUM

BACKGROUND OF THE INVENTION

Field of the Invention

The present invention relates to a printing apparatus, a method of controlling the same, and a storage medium.

Description of the Related Art

Conventionally, a needle-less binding apparatus for performing a binding process without using a needle for a bundle of multiple sheets in an image forming apparatus, such as a copier or a printing apparatus, has been known (see Japanese Patent Laid-Open No. 2004-167700). Such a needle-less binding apparatus has been implemented in various forms. A typical apparatus causes a binding tool to apply a half-blanked or folding process to an end of a sheet bundle, thereby forming a bound portion. This type of needle-less binding apparatus does not use a metal needle in contrast to a needle binding apparatus for performing a binding process using a metal needle. Accordingly, the needle-less binding apparatus is effective in conserving resources. This apparatus negates the need of an operation of removing a metal needle during taking apart a sheet bundle, thereby facilitating the operation of separating into sheets.

In a typical needle binding apparatus having a binder unit of binding sheets with a staple of a stapler, the binder unit has a small size and is therefore movable. The binder unit is able to be moved to a position designated by a user, such as "upper right", "upper left", "lower right" and "lower left" positions of a sheet, and perform a binding process. On the contrary, in the needle-less binding apparatus having a binder unit of binding without using a staple, the binder unit requires caulk binding of sheets. Accordingly, the binder unit has a large size and cannot move freely. The user is therefore required to set sheets in a correct orientation in order to perform binding process at a position designated by the user, which is any of the "upper right", "upper left", "lower right" and "lower left" positions of a sheet.

If these two types of binder units are implemented in one apparatus, the user is required to change the orientation of sheets according to the binding position in order to obtain a sheet bundle to which a binding process has been applied at a correct position by a corresponding type of binder unit. This requirement forces the user to pay additional attention to the binding process.

SUMMARY OF THE INVENTION

An aspect of the present invention is to eliminate the above-mentioned problems with conventional technology.

A feature of the present invention is to provide a technique for automatically switching the discharge order of printed sheets and the discharged front faces of printed sheets according to the binding position, even in the case of execution of any of needle binding process and needle-less binding, thereby it is possible to negate the user's attention to a setting orientation of sheets in the binding process.

The present invention in its first aspect provides a printing apparatus, comprising: a first binding unit that is able to move to a plurality of positions and performs a binding process at any one of the plurality of positions; a second binding unit that performs a binding process at a single position where the second binding unit can perform a binding process; a printing unit that prints an image represented by image data, on a sheet; and a control unit that, (i) in a case that the binding process is performed using the first binding unit, controls the printing unit to print images on sheets according to an input order of the image data, and (ii) in a case that the binding process is performed using the second binding unit, controls the printing unit to print images on sheets according to the input order of the image data, or controls the printing unit to print images on sheets according to an order reversed from the input order of the image data, based on an orientation of the images represented by the image data, the single position where the binding process is performed using the second binding unit, and the orientation of the sheets used for printing by the printing unit.

The present invention in its second aspect provides a method of controlling a printing apparatus, comprising: moving a first binding unit to one of a plurality of positions and performing a binding process at the one of the plurality of positions; performing a binding process using a second binding unit at a single position where the second binding unit can perform a binding process; printing an image based on image data, on a sheet; and controlling:

(i) in a case that the binding process is performed using the first binding unit, to print images on sheets according to an input order of the image data, and (ii) in a case that the binding process is performed using the second binding unit, to print images on sheets according to the input order of the image data, or to print the images on the sheets according to an order reversed from the input order of the image data, based on an orientation of the images represented by the image data, the single position where the binding process is performed using the second binding unit, and the orientation of the sheets used for printing in the printing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4C depict sectional views for illustrating binding process by a second binder unit.

FIGS. 8A to 8E are diagrams for illustrating an example of a screen transition of a needle binding setting screen displayed on a display unit when a user designates needle binding to the multi-function peripheral according to the embodiment.

FIGS. 10A to 10D are diagrams for describing a layout method of original images in the case of executing one-needle binding at the upper left of printed sheets and discharging sheet bundles onto a stack tray in a copy process of the multi-function peripheral according to the embodiment.

FIGS. 11A to 11D are diagrams for describing a layout method of original images in the case of executing one-point needle binding at the upper right of printed sheets and discharging sheet bundles onto the stack tray in the copy process of the multi-function peripheral according to the embodiment.

FIGS. 12A to 12D are diagrams for describing a layout method of original images in the case of executing one-point needle binding at the lower left of printed sheets and discharging sheet bundles onto the stack tray in the copy process of the multi-function peripheral according to the embodiment.

FIGS. 13A to 13D are diagrams for describing a layout method of original images in the case of executing one-point needle binding at the lower right of printed sheets and discharging sheet bundles onto the stack tray in the copy process of the multi-function peripheral according to the embodiment.

FIGS. 14A to 14D are diagrams for describing a layout method of original images in the case of executing needle-less binding at the upper left of printed sheets and discharging sheet bundles onto a stack tray in the copy process of the multi-function peripheral according to the embodiment.

FIGS. 15A to 15D are diagrams for describing a layout method of original images in the case of executing needle-less binding at the upper right of printed sheets and discharging sheet bundles onto the stack tray in the copy process of the multi-function peripheral according to the embodiment.

FIGS. 16A to 16D are diagrams for describing a layout method of original images in the case of executing needle-less binding at the lower left of printed sheets and discharging sheet bundles onto the stack tray in the copy process of the multi-function peripheral according to the embodiment.

FIGS. 17A to 17D are diagrams for describing a layout method of original images in the case of executing needle-less binding at the lower right of printed sheets and discharging sheet bundles onto the stack tray in the copy process of the multi-function peripheral according to the embodiment.

FIG. 23 is a flowchart for describing procedures of a needle-less binding forward order printing process in steps S2204, S2214, S2222 and S2226 of FIGS. 22A and 22B.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

Figure 1:
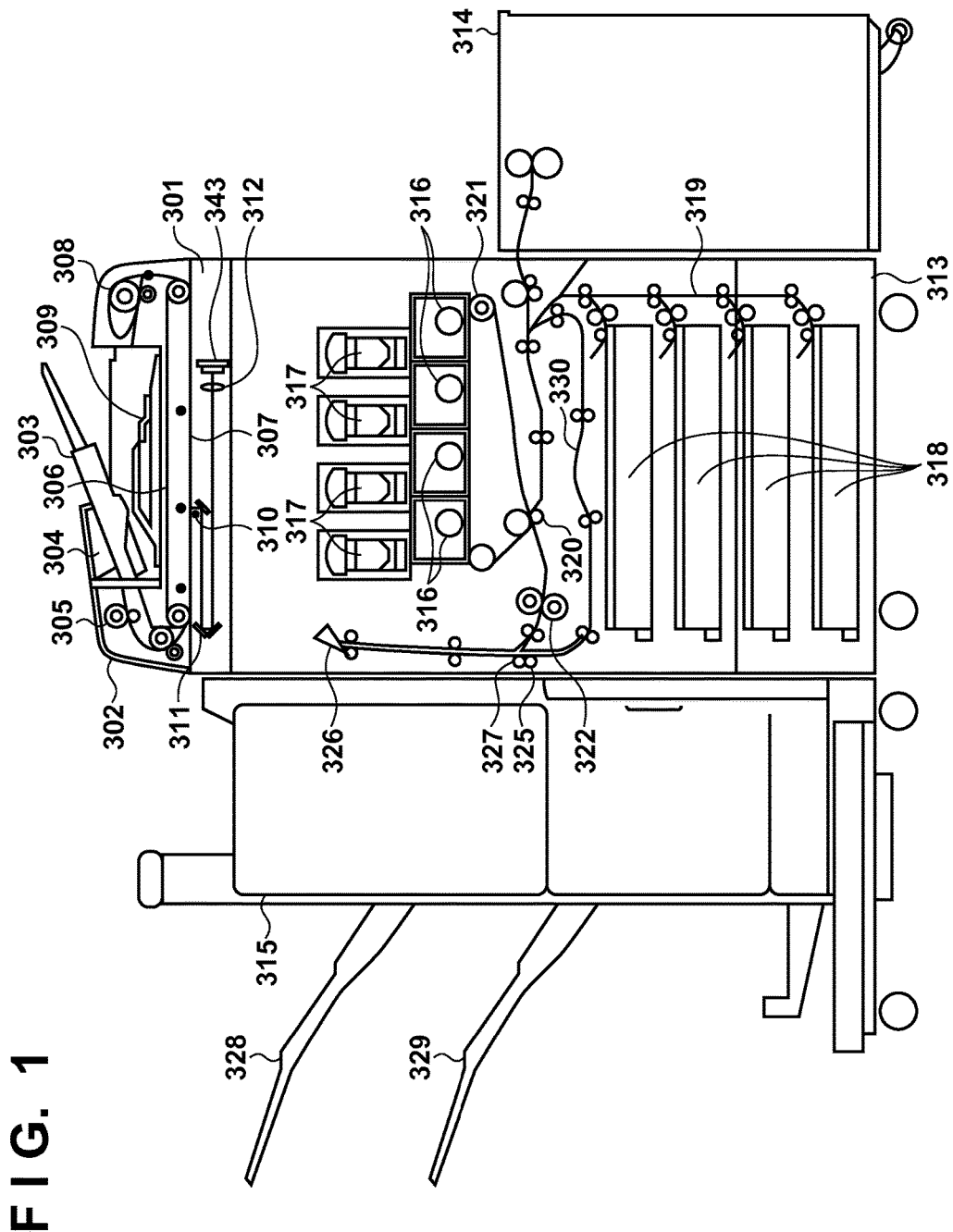
FIG. 1 is a diagram for illustrating a configuration of a multi-function peripheral according to an embodiment of the present invention.

FIG. 1 is a diagram for illustrating a configuration of a multi-function peripheral (MFP) according to an embodiment of the present invention. In this embodiment, an example of a printing apparatus according to the present invention is described using an example of a multi-function peripheral that has functions of a copier, a printer, a facsimile machine and the like. Alternatively, the printing apparatus of the present invention may be an apparatus that only has a printing function. The multi-function peripheral according to this embodiment includes a scanner unit 301, a document feeder (DF) 302, a printer unit 313 including four-color drums, a sheet supply deck 314, and a finisher 315.

First, a reading operation to be performed mainly by the scanner unit 301 is described.

In the case of setting an original on a platen glass and performing a reading operation, a user sets the original on the platen glass 307 and closes the DF (document feeder) 302. When an open/close sensor detects that the DF 302 is closed, an original size detection reflective sensor in the casing of the scanner unit 301 detects the size of the original. Upon detection of the original size, a light source 310 irradiates the original with light, and the light is reflected by the original and enter a CCD 343 via a reflector (mirror) 311 and a lens 312. The CCD 343 converts the incident light into a digital signal, and transmits the signal to a control unit (see FIG. 6). The control unit applies a predetermined image processing to the transmitted digital signal to convert the signal into a laser recording signal, and stores the converted signal as image data into a memory.

In the case of setting originals on the DF 302 and performing a reading operation, the user puts the originals on a tray of an original setting unit 303 of the DF 302 in a face-up manner. When the originals are put, an original presence detection sensor 304 detects that the originals are set. When the control unit detects that the originals are set by the original presence detection sensor 304, the control unit causes a feed roller 305 and a conveyance belt 306 to rotate, and conveys an original to a predetermined position on the platen glass 307. After transmission of the original to the predetermined position, the control unit performs the reading operation similar to the reading of an original on the platen glass 307, and stores the obtained image data into the memory. The original, having already been subjected to the reading operation, is discharged to a discharge tray 309 via a conveyance roller 308. In the case of multiple originals set on the DF 302, the control unit discharges the original, having already been subjected to the reading operation, while supplying the next original through the feed roller 305 at the same time and performs a reading operation for the next original. The reading operation is thus performed for the multiple originals.

Next, a printing operation by the printer unit 313 is described.

A recording signal (print image data) temporarily stored in the memory in the control unit is transmitted to the printer unit 313, and converted by a laser recording unit into recording laser light for Y (yellow), M (magenta), C (cyan) and B (black) colors. Photosensitive drums 316 for respective colors are respectively irradiated with the corresponding recording laser light, thereby forming electrostatic latent images according to the colors on the respective photosensitive drums. Each of the latent images is developed with a toner supplied from a corresponding toner cartridge 317. The developed images are primarily transferred to be overlapped onto an intermediate transfer belt 321 which rotates in the clockwise direction. Subsequently, the image on the intermediate transfer belt 321 is transferred at a secondary transfer position 320 from the intermediate transfer belt 321 to a sheet supplied from a sheet cassette 318 or the sheet supply deck 314 via a sheet supply conveyance path 319. The toner on the sheet is fixed by a fixing unit 322 with applied pressure and heat onto the sheet on which the images have been transferred, and the sheet is transferred along a sheet discharge conveyance path. The sheet is controlled to be reversed using flappers 326 and 327 so as to cause the image-bearing (printed) surface facing downward. The sheet is discharged to a sheet discharge port 325 to the finisher in a face-down manner. In the case of double-sided printing, after the sheet passes through the fixing unit 322, the conveyance path is switched by the flapper 327. Subsequently, the sheet is switched and transmitted downward, passes through a conveyance path 330 for double-sided printing, and is resupplied to the secondary transfer position 320, thereby achieving a double-sided printing operation.

Subsequently, operations performed by the finisher 315 are described.

The finisher 315 applies a post-process to printed sheets according to setting designated by the user. More specifically, the finisher 315 has functions of binding (one-position needle binding, two-positions needle binding, and needleless binding) and punching (two-hole, three-hole, and four-hole), saddle stitching process and the like. The finisher 315 includes stack trays 328 and 329. The discharge destination for the sheet, having passed through the sheet discharge port 325 to the finisher 315, is switched according to settings by the user for each of functions of, for example, a copier, a printer and a FAX. In the case of use as a printer, various settings can be made through a printer driver. The settings include monochrome/color printing, sheet size, two-up, four-up and N-up printing, double-sided printing, stapling, punching, saddle stitching, center-folding, inserting paper, front cover printing, and back cover printing. Description is hereinafter made with a definition where a side toward the user standing in front of the multi-function peripheral is referred to as a near side, and a side far from the user is referred to as a far side.

Next, the configuration of the finisher 315 is described with reference to FIG. 2.

Figure 2:
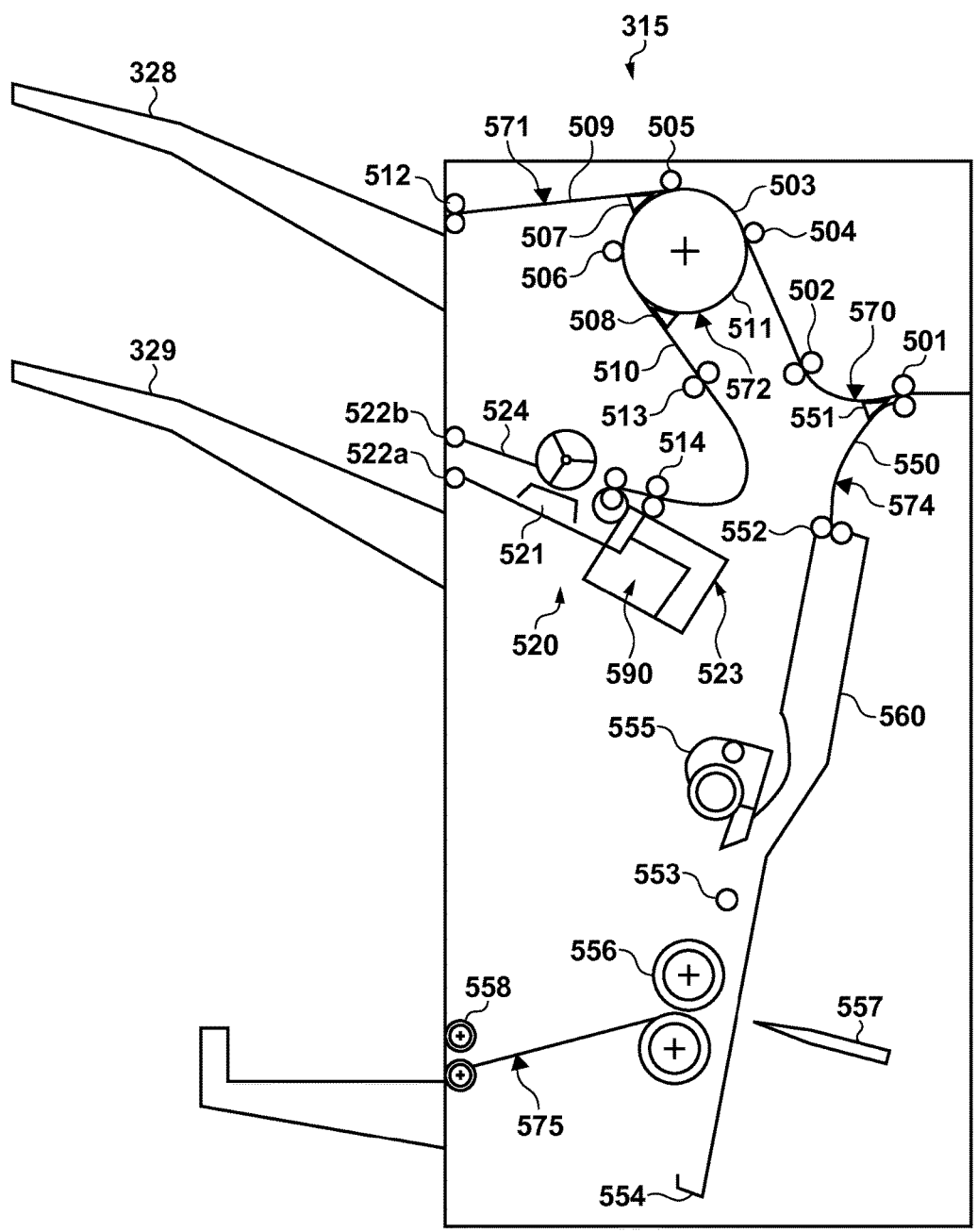
FIG. 2 is a diagram for illustrating a configuration of a finisher according to the embodiment.

FIG. 2 is s diagram for illustrating the configuration of the finisher 315 according to the embodiment.

The finisher 315 sequentially takes sheets discharged from the sheet discharge port 325 to the finisher 315, and selectively performs the following predetermined processes. The predetermined processes include a process of aligning the sheets and bundling the sheets into one bundle, a binding process of binding the bundled sheets at around a trailing edge of sheets with a stapler, a punching process of punching the sheets around the trailing edge of sheets, a sorting process, a non-sorting process, and a bookbinding process.

As shown in FIG. 2, the finisher 315 conveys the printed sheet discharged from sheet discharge port 325 to the finisher while sandwiching the sheet by an entrance roller pair 501, thereby taking the printed sheet. The sheet taken by the entrance roller pair 501 is conveyed to a buffer roller 503 through a conveyance roller pair 502. An entrance sensor 570 is provided at the middle of the conveyance path between the entrance roller pair 501 and the conveyance roller pair 502. A switching flapper 551 is provided downstream of the entrance roller pair 501. The switching flapper 551 can switch the path to any of a path to a sort path 510 and a non-sort path 509 and a path to a bookbinding path 550.

The buffer roller 503 is a roller that allows a predetermined number of sheets transmitted via the conveyance roller pair 502 to be wound around the outer periphery of the roller 503 in a stacked manner. The sheets are wound by pushing rollers 504, 505 and 506 against the outer periphery of the roller 503 during rotation of the roller 503. The wound sheets are conveyed in the rotational direction of the buffer roller 503. A switching flapper 507 is arranged between the pushing rollers 505 and 506. A switching flapper 508 is arranged downstream of the pushing roller 506. The switching flapper 507 is a flapper for separating a sheet wound around the buffer roller 503 from this buffer roller 503 and guiding the sheet to the non-sort path 509 or the sort path 510. The switching flapper 508 is a flapper for separating a sheet wound around the buffer roller 503 from the buffer roller 503 and guiding the sheet to the sort path 510, or for guiding the sheet wound around the buffer roller 503 to a buffer path 511 in a wound manner. In the case of guiding the sheet wound around the buffer roller 503 to the non-sort path 509, the switching flapper 507 operates, and the wound sheet is separated from the buffer roller 503 and guided to the non-sort path 509. The sheet thus guided to the non-sort path 509 is discharged onto the stack tray 328 through a discharge roller pair 512. A discharge sensor 571 is provided at the middle of the non-sort path 509.

In the case of guiding the sheet wound around the buffer roller 503 to the buffer path 511, neither the switching flapper 507 nor the switching flapper 508 operate, and the sheet is conveyed to the buffer path 511 in a manner wound around the buffer roller 503. A buffer path sensor 572 for detecting a sheet on the buffer path 511 is provided at the middle of the buffer path 511.

In the case of guiding the sheet wound around the buffer roller 503 to the sort path 510, the switching flapper 507 does not operate but the switching flapper 508 operates, and the sheet wound around the buffer roller 503 is separated from the buffer roller 503 and the sheet is guided to the sort path 510. The sheet guided to the sort path 510 is stacked on an intermediate tray (hereinafter, referred to as a process tray) 520 through conveyance roller pairs 513 and 514. The sheets stacked on the process tray 520 in a bundled manner are subjected to an aligning process by aligning elements 521 provided at the near side and the far side and a staple process as necessary. Subsequently, the sheets are discharged by discharge rollers 522*a* and 522*b* onto the stack tray 329. The discharge roller 522*b* is supported by a swing guide (swing guide) 524. The swing guide 524 is swung by a swing motor (not shown) so as to bring the discharge roller 522*b* into contact with the top sheet of the sheets stacked on the process tray 520. In a state where the discharge roller 522b is in contact with the top sheet of the sheets stacked on the process tray 520, the discharge roller 522b can cooperate with the discharge roller 522a to discharge the sheet bundle on the process tray 520 toward the stack tray 329.

The aforementioned binding process is performed by a stapler 523 and a binder 590. The stapler 523 is a first binder unit that has a function of binding sheets using a metal needle (hereinafter, referred to as needle binding). The stapler 523 is configured to be movable along the outer periphery of the process tray 520. The stapler 523 can bind the sheet bundle stacked on the process tray 520 at around the trailing edge of the sheets in the sheet conveyance direction on a far side or a near side. The binder 590 is a second binder unit that has a function of binding sheets with no staple (hereinafter, referred to as needle-less binding). Methods of needle-less binding with no staple are various as described above. In this embodiment, description is made using an example that adopts a binder that binds sheets by applying pressure between the top and the bottom in the thickness direction of sheets to bring the sheets into close contact with each other. The binder 590 can be fixed at a position laterally aside of the process tray 520, and bind the sheet bundle stacked on the process tray 520 at around the trailing edge of the sheets in the sheet conveyance direction on the far side.

Sheets guided by the switching flapper 551 to the bookbinding path 550 are subjected to the a center-folding process of half-folding the sheet bundle at the center by a center-folding mechanism as a center-folding process unit, which will be described later. The sheets guided to the bookbinding path 550 are conveyed to a bookbinding intermediate tray (hereinafter, referred to as a book binding process tray) 560 through a conveyance roller pair 552. A bookbinding entrance sensor 574 is provided at the middle of the bookbinding path 550. The book binding process tray 560 is provided with an intermediate roller 553 and a movable sheet positioning member 554. An anvil (not shown) is provided at a position opposite to a stapler 555. The stapler 555 and the anvil can cooperate to apply a staple process to the sheet bundle stored on the book binding process tray 560. A folding roller pair 556, and a protruding member 557 at a position opposite to the folding roller pair 556 are provided downstream of the stapler 555. The protruding member 557 is protruded toward the sheet bundle stored on the book binding process tray 560, and pushes the sheet bundle stored on the book binding process tray 560 in a bundled manner to the folding roller pair 556. The folding roller pair 556 folds the sheet bundle and conveys the bundle to the downstream. The folded sheet bundle is passed to a device on a downstream side in the conveyance direction through a conveyance roller pair 558. A discharge sensor 575 is provided downstream of the conveyance roller pair 558.

Next, arrangement and binding working areas of the first binder unit (stapler 523) and the second binder unit (binder 590) shown in FIG. 2 are described with reference to FIG. 3.

Figure 3:
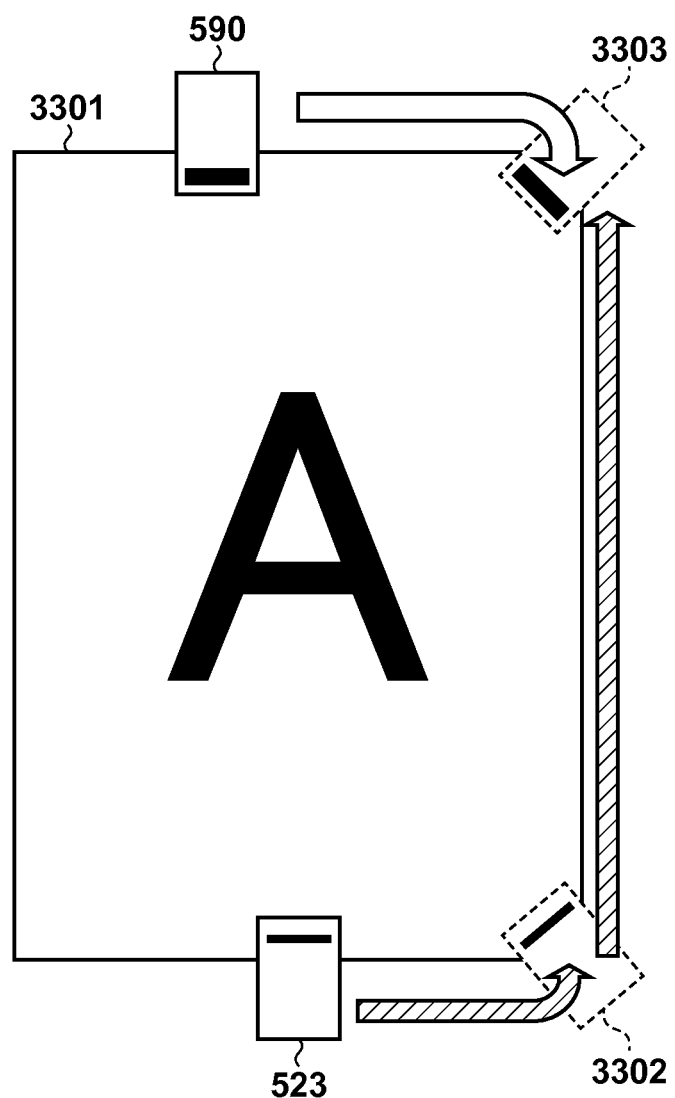
FIG. 3 is a diagram for illustrating arrangement and binding working areas of each binding unit in the finisher according to the embodiment.

FIG. 3 is a diagram for illustrating the arrangement and the binding working areas of each binder unit of the finisher 315 according to the embodiment.

In FIG. 3, reference numeral 3301 denotes sheets to be bound. This diagram shows a state where the stapler 523, which is the first binder unit that uses a staple, is stopped at a standby position. In the case of actually binding the sheets at a portion on the near side, the stapler 523 moves from the standby position to a binding position 3302 indicated by an arrow, and binds the sheets. In the case of binding the sheets at a portion on the far side, the stapler 523 moves from the standby position to a binding position 3303 indicated by another arrow, and binds the sheets. The stapler 523 is thus movable along multiple sides of the sheets. Description of a mechanism of moving the binder unit is omitted. However, the movement and the like are controlled according to an instruction from a CPU, which will be described later.

Likewise, the binder 590, which is the second binder unit that uses no staple, is normally stopped at a standby position indicated in FIG. 3. In the case of binding sheets using the binder 590, the binder 590 moves from the standby position to the binding position 3303, and binds the sheet. The binder 590 is thus movable along only one side of the sheet.

Next, the method of binding sheets by pressure applied between the top and the bottom in the thickness direction of sheets is described with reference to FIG. 4A to FIG. 6.

FIGS. 4A to 4C depict sectional views for describing binding process by the second binder unit (binder 590) shown in FIG. 2.

As shown in FIG. 4A, an upper die 401 applies pressure to the top of sheet bundle to press the sheets. The upper die 401 is provided with multiple convex blades 402. These blades 402 apply pressure a sheet bundle 403 at multiple points. This application prevents the bound sheets from being easily separated from each other. A lower die 405 applies pressure to the bottom of the sheet bundle 403 to press the sheets. The lower die 405 is provided with concaves 404 in conformity with the respective blades 402 of the upper die 401. The concaves 404 are to respectively receive the respective blades 402. The upper die 401 and the lower die 405 apply pressure to the sheet bundle 403 in the vertical direction as shown in FIG. 4B, thereby allowing the sheets to be bound. A section of the sheet bundle 403 after the binding is as shown in FIG. 4C.

Figure 5:
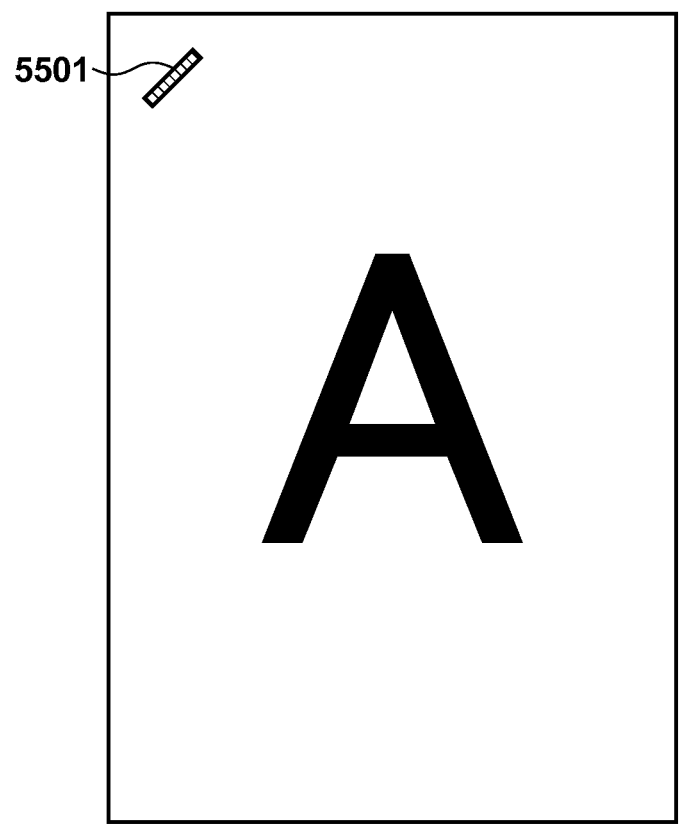
FIG. 5 depicts a plan view of sheets bound by the second binder unit.

FIG. 5 depicts a plan view of the thus bound sheets using the binder 590. Black portions at a binding position 5501 are portions of the sheets collapsed by application of pressure.

Figure 6:
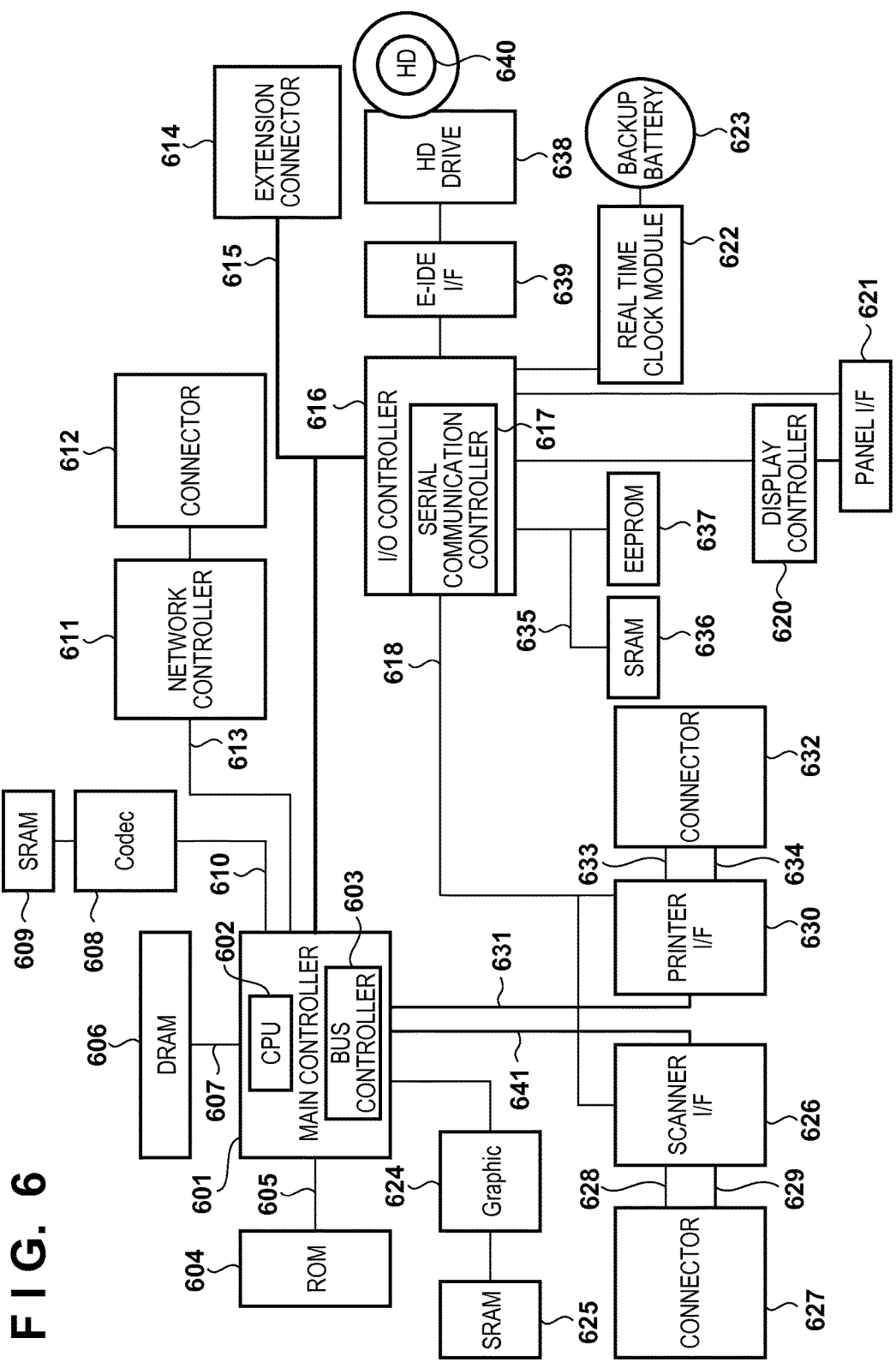
FIG. 6 is a block diagram for describing a configuration of a control unit that controls the multi-function peripheral according to the embodiment.

FIG. 6 is a block diagram for describing the configuration of the control unit that controls the multi-function peripheral according to the embodiment.

A main controller 601 mainly includes a CPU 602, a bus controller 603, and various I/F controllers. The CPU 602 and the bus controller 603 control the entire operations of the multi-function peripheral. The CPU 602 operates according to programs read from a ROM 604 via a ROM I/F 605. Operations of analyzing PDL (page description language) code data received from an external PC and developing the data into raster image data are also described in the programs, and processed by means of software. The bus controller 603 controls transmission of data input from and output to each I/F, and controls arbitration of buses and DMA data transmission.

A DRAM 606 is connected to the main controller 601 via a DRAM I/F 607. This DRAM 606 provides working areas for operations of the CPU 602, and areas for storing image data. A codec 608 compresses raster image data stored in the DRAM 606 according to any of schemes, such as MH, MR, MMR, JBIG and JPEG. Inversely, the codec 608 decompresses the compressed and stored code data to raster image data. An SRAM 609 is used as a temporary working area for the codec 608. The codec 608 is connected to the main controller 601 via an I/F 610. Data transmission between the codec 608 and the DRAM 606 is controlled by bus controller 603, thus achieving DMA transmission.

A graphic processor 624 applies processes, such as image rotation, image scaling, color space conversion, and binarization, to the raster image data stored in the DRAM 606.

An SRAM 625 is used as a temporary working area for the graphic processor 624. The graphic processor 624 is connected to the main controller 601 via an I/F. Data transmission between the graphic processor 624 and the DRAM 606 is controlled by the bus controller 603, thus achieving DMA transmission.

A network controller 611 is connected to the main controller 601 via an I/F 613. The network controller 611 is connected to an external network by a connector 612. Print data from the external PC via the network is received by the network controller 611, and transmitted to the CPU 602. The CPU 602 stores the received print data in the DRAM 606 or a hard disk 640 and processes this data.

An extension connector 614 and an I/O controller 616 are connected to a general-purpose high-speed bus 615. In this embodiment, commands are transmitted to and received from the finisher 315 via the general-purpose high-speed bus 615. The I/O controller 616 is provided with an asynchronous serial communication controller 617 for transmitting and receiving control commands to and from the CPUs of the scanner unit 301 and the printer unit 313. The I/O controller 616 is connected to a scanner I/F 626 and a printer I/F 630 via an I/O bus 618.

A panel I/F 621 is connected to a display controller 620. The panel I/F 621 includes an I/F for displaying on a display unit 705 on an console unit 701 shown in FIG. 7, and a key input I/F for input via hard keys and touch panel keys. The console unit 701 includes the display unit 705, a touch panel input device pasted on the display unit 705, and multiple hard keys. Signals input from the touch panel or the hard keys are transmitted to the CPU 602 via the aforementioned panel I/F 621. The display unit 705 displays image data transmitted from the panel I/F 621. The console unit 701 will be described later with reference to FIG. 7.

A real time clock (RTC) module 622 is for updating and storing a date and time managed by the multi-function peripheral, and is backed up by a backup battery 623. An E-IDE I/F 639 is for connecting an external storing device. In this embodiment, the CPU 602 is connected with a hard disk drive 638 via the E-IDE I/F 639, and stores image data in the hard disk 640, and reads the image data from the hard disk 640. Connectors 627 and 632 are connected to the scanner unit 301 and the printer unit 313, respectively, and include an asynchronous serial I/Fs (628 and 633) and video I/Fs (629 and 634).

The scanner I/F 626 is connected to the scanner unit 301 via the connector 627, and also connected to the main controller 601 via a scanner bus 641. The scanner I/F 626 has a function of applying a predetermined process to image data received from the scanner unit 301. The scanner I/F 626 further has a function of outputting, to the scanner bus 629, a control signal generated on the basis of a video control signal transmitted from the scanner unit 301. Data transmission from the scanner bus 629 to the DRAM 606 is controlled by the bus controller 603.

The printer I/F 630 is connected to the printer unit 313 via the connector 632, and also connected to the main controller 601 via a printer bus 631. The printer I/F 630 applies a predetermined process to image data output from the main controller 601, and outputs the data to the printer unit 313. Furthermore, the printer I/F 630 has a function of outputting, to the printer bus 631, a control signal generated on the basis of a control signal transmitted from the printer unit 313. Transmission of raster image data developed on the DRAM 606 to the printer unit 313 is controlled by the bus controller 603, thereby achieving DMA transmission via the printer bus 631 and the video I/F 634 to the printer unit 313.

An SRAM 636 is backed up by a backup battery, and can hold the content of memory even if the power of the multi-function peripheral is turned off. The SRAM 636 is connected to the I/O controller 616 via a bus 635. Likewise, an EEPROM 637 is a memory connected to the I/O controller 616 via the bus 635.

Figure 7:
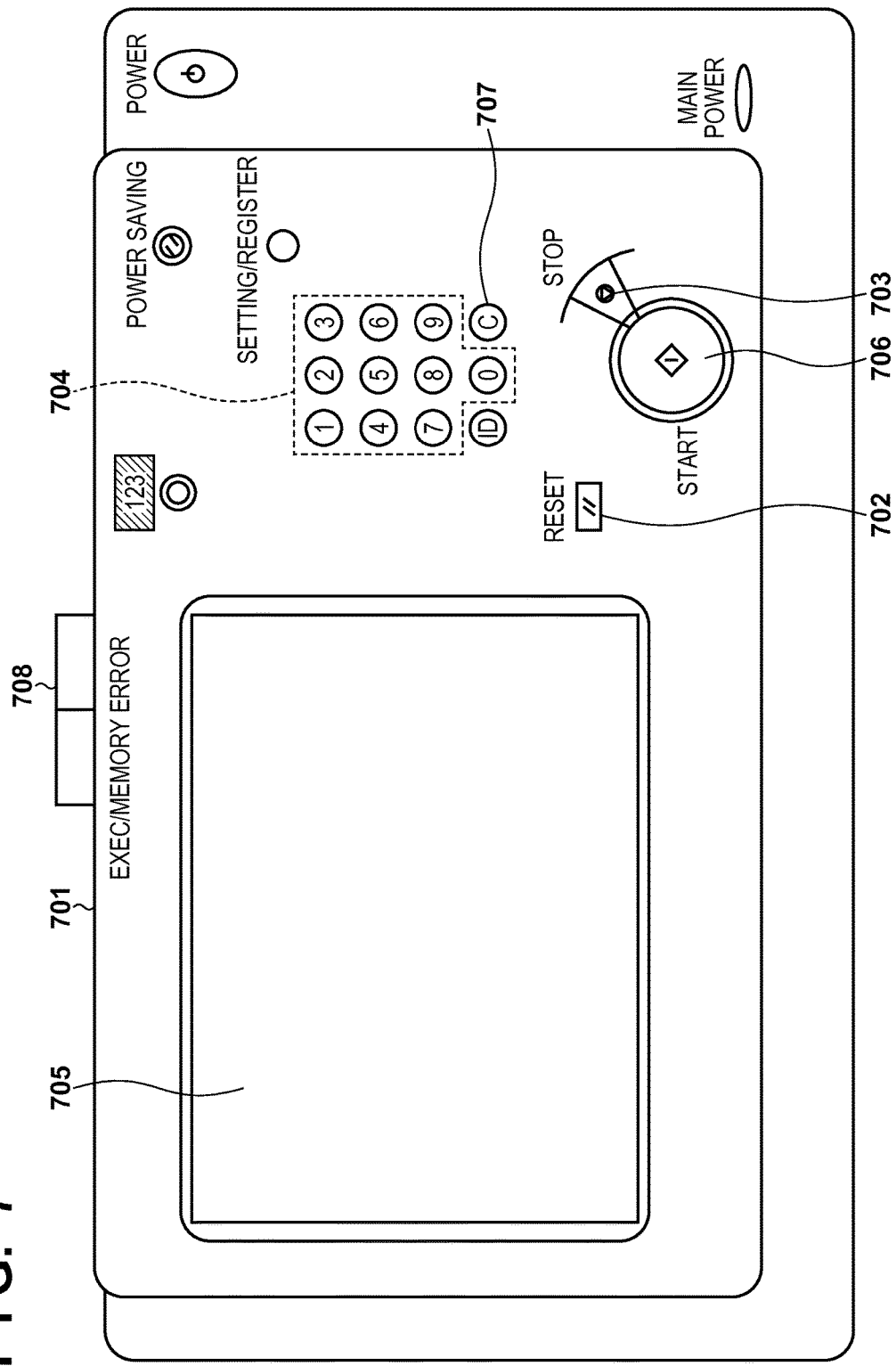
FIG. 7 depicts a plan view of a console unit of the multi-function peripheral of the embodiment.

FIG. 7 depicts a plan view of the console unit 701 of the multi-function peripheral according to the embodiment.

A user performs various print settings via the console unit 701. A reset key 702 is a key for canceling a setting value and the like set by the user. A stop key 703 is a key for instructing to terminate a job in operation. Numeric keys 704 are keys for numeric input of numerals and the like. The display unit 705 includes a touch panel and a display in an integrated manner. Various screens are displayed on the display unit 705 according to instructions from the CPU 602. The display unit 705 accepts instructions from the user via the touch panel. A start key 706 is a key for instructing to start a job, such as of reading an original. A clear key 707 is a key for clearing settings and the like. A lamp 708 notifies the user of the state of the multi-function peripheral by lighting up when a job is in operation or when an error occurs in the multi-function peripheral or the finisher 315.

Next, procedures of setting needle binding and needleless binding are described with reference to FIGS. 8A to 8E and FIGS. 9A to 9F.

FIGS. 8A to 8E are diagrams for describing an example of a screen transition of a needle binding setting screen displayed on the display unit 705 when the user sets needle binding in the multi-function peripheral according to the embodiment.

Figure 8A:
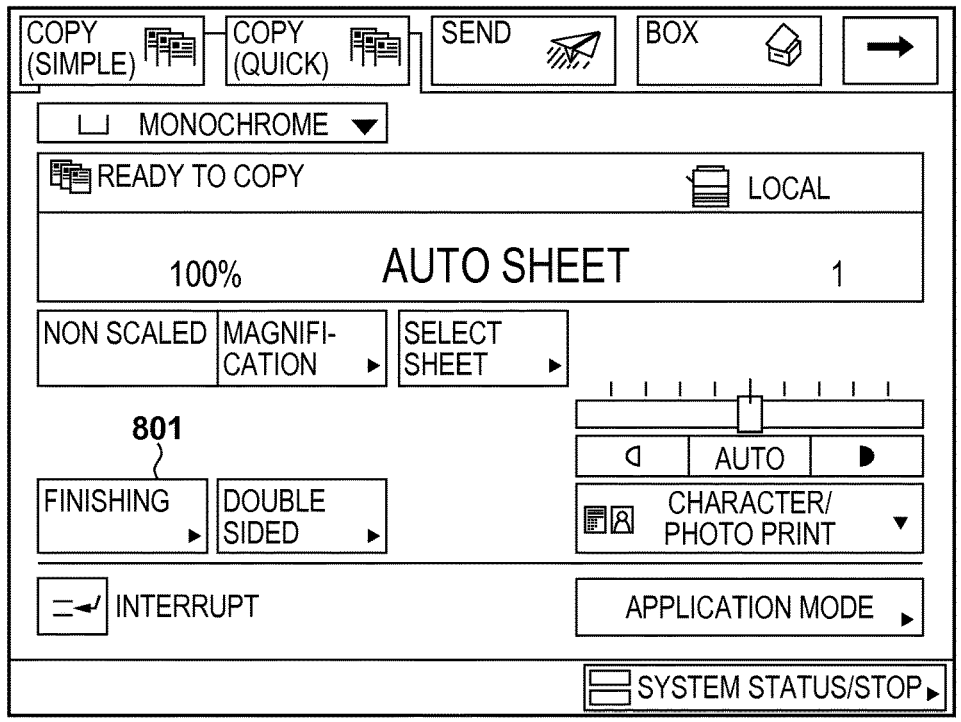

FIG. 8A depicts a copy initial screen displayed on the display unit 705. This diagram shows that automatic sheet selection for automatically selecting an optimal sheet on the basis of setting and achieving a copy operation has been set. When the CPU 602 detects that a "Finishing" button 801 is pressed via the copy initial screen, the CPU 602 displays a screen of selecting a finishing type shown in FIG. 8B. On the screen of selecting the finishing type, "Sort" button, "Group" button, "Shift" button, "Staple Sort" button are displayed. When the CPU 602 detects that the "Staple Sort" button 802 is pressed via the screen of selecting the finishing type, the CPU 602 displays a screen of FIG. 8C and the "Staple Sort" button 802 is highlighted and the display of an "OK" button 803 is switched to the display of a "Next" button as shown in FIG. 8C.

Figure 8B:
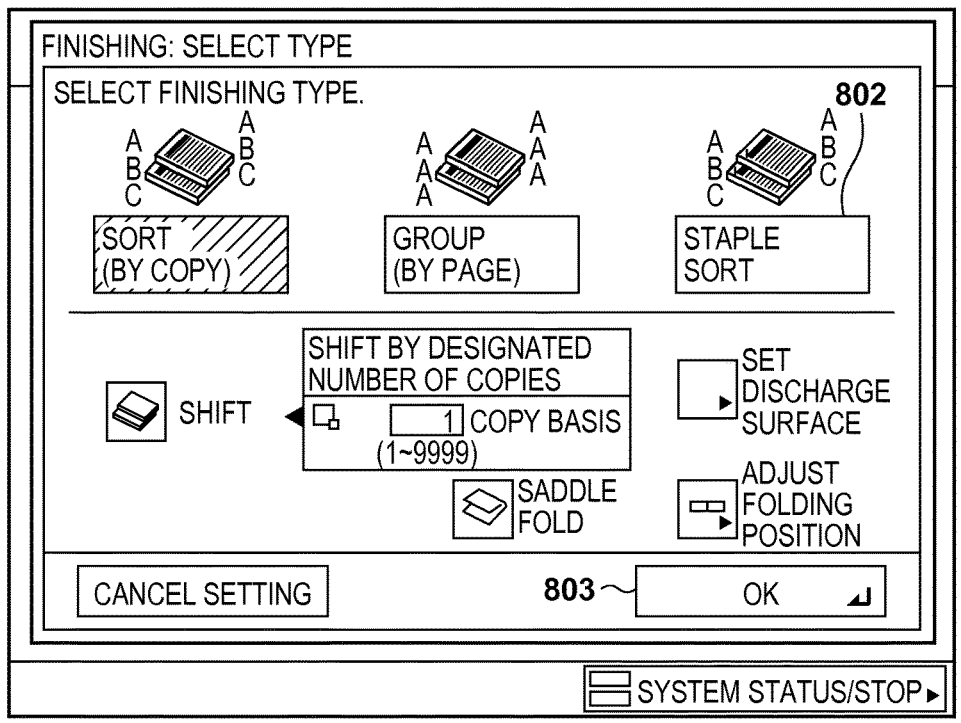
Figure 8C:
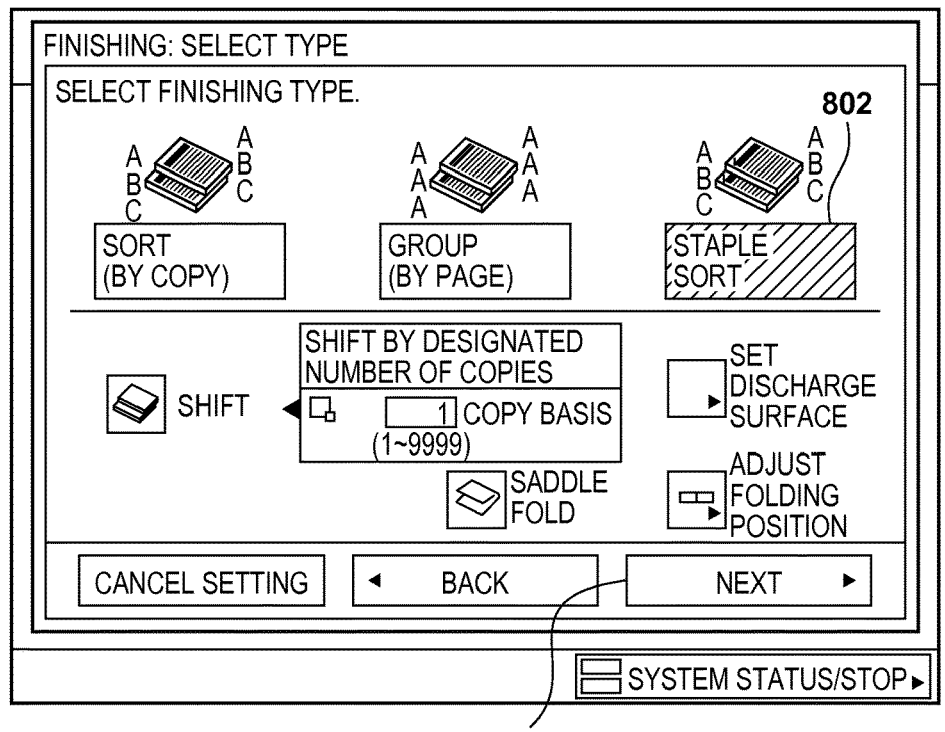
Figure 8D:
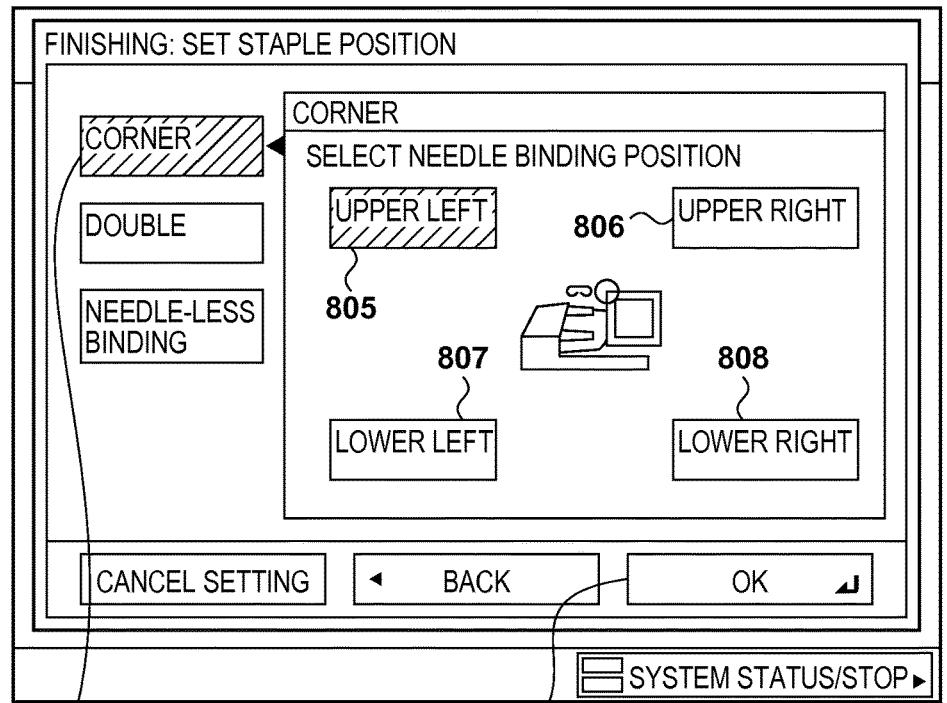

When the CPU 602 detects that the "Next" button 803 is pressed via the screen of FIG. 8C, the CPU 602 displays a needle binding position selecting screen shown in FIG. 8D. On the needle binding position selecting screen, an "Upper Left" button 805, an "Upper Right" button 806, a "Lower Left" button 807 and a "Lower Right" button 808 are displayed to allow the user to select a desired binding position. In FIG. 8D, the "Upper Left" button 805 is selected. On the needle binding position selecting screen, a "Corner" button 804 is highlighted to display that one-position needle binding is set.

When the CPU 602 detects that an "OK" button 809 is pressed via the needle binding position selecting screen of FIG. 8D, the display is returned to a copy initial screen shown in FIG. 8E. In this state, as indicated by numeral 810, the display indicates that setting for needle binding at the upper left of sheet has been completed.

FIGS. 9A to 9F are diagrams showing an example of screen transition of a needle-less binding setting screen displayed on the display unit 705 when the user sets needle-less binding in the multi-function peripheral according to the embodiment.

Figure 9A:
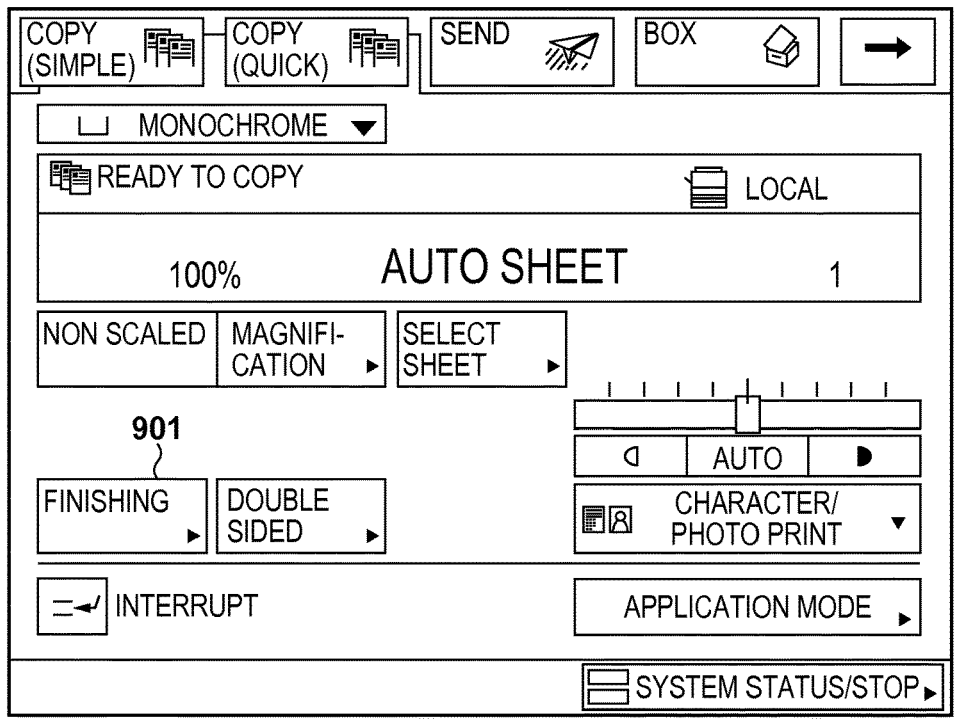
FIGS. 9A to 9F are diagrams for illustrating an example of a screen transition of a needle-less binding setting screen displayed on the display unit when the user designates needle-less binding to the multi-function peripheral according to the embodiment.
Figure 9B:
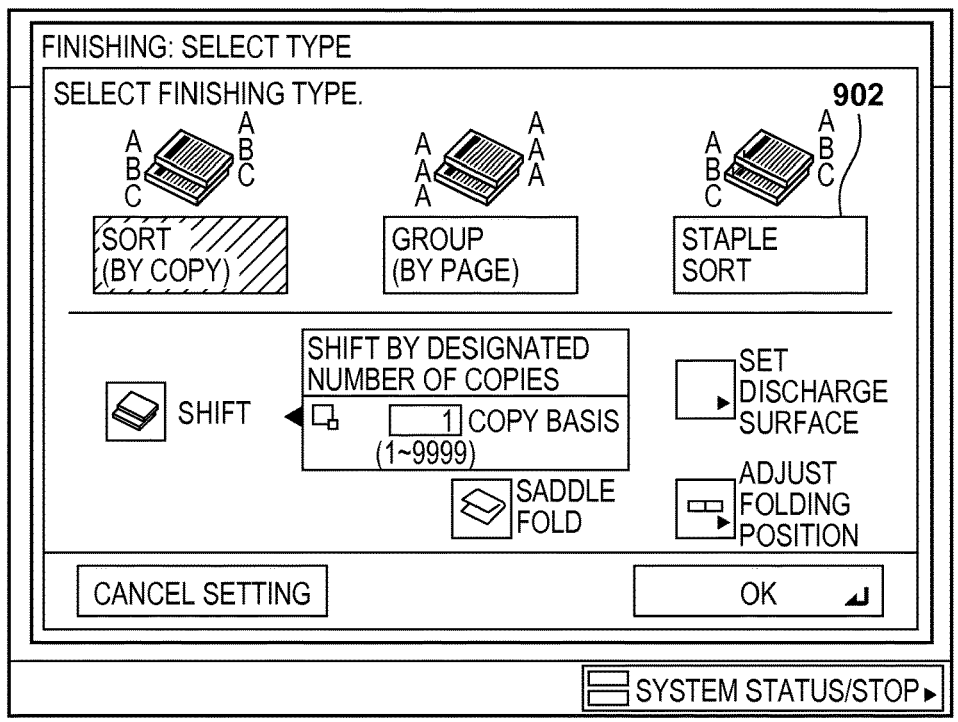
Figure 9C:

FIG. 9A, as with FIG. 8A, shows a copy initial screen displayed on the display unit 705. FIG. 9B, as with FIG. 8B, shows a screen of selecting the finishing type displayed when a finishing button 901 displayed on the display unit 705 is pressed. FIG. 9C, as with FIG. 8C, shows a screen displayed on the display unit 705 when a "Staple Sort" button 902 is pressed. Furthermore, FIG. 9D, as with FIG. 8D, shows a needle binding position selecting screen displayed on the display unit 705 when a "Next" button 903 is pressed on the screen of FIG. 9C.

Figure 9D:
Figure 9E:
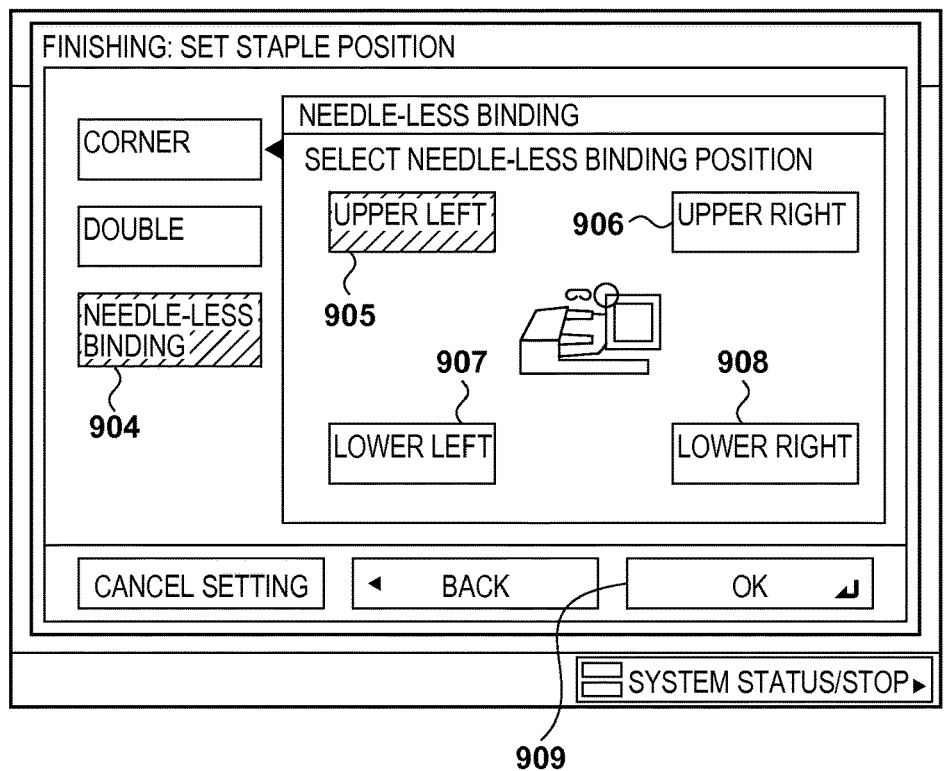

When the CPU 602 detects that a "Needle-less binding" button 904 is pressed via the needle binding position selecting screen of FIG. 9D, the CPU 602 displays a needle-less binding position selecting screen shown in FIG. 9E. On the needle-less binding position selecting screen in FIG. 9E, an "Upper Left" button 905, an "Upper Right" button 906, a "Lower Left" button 907 and a "Lower Right" button 908 are displayed to allow the user to select a desired binding position. On the needle-less binding position selecting screen of FIG. 9E, the "Needle-less binding" button 904 is highlighted to display that needle-less binding is set because the "Needle-less binding" button 904 is pressed in FIG. 9D, and the "Upper Left" button 905 is selected.

Figure 9F:
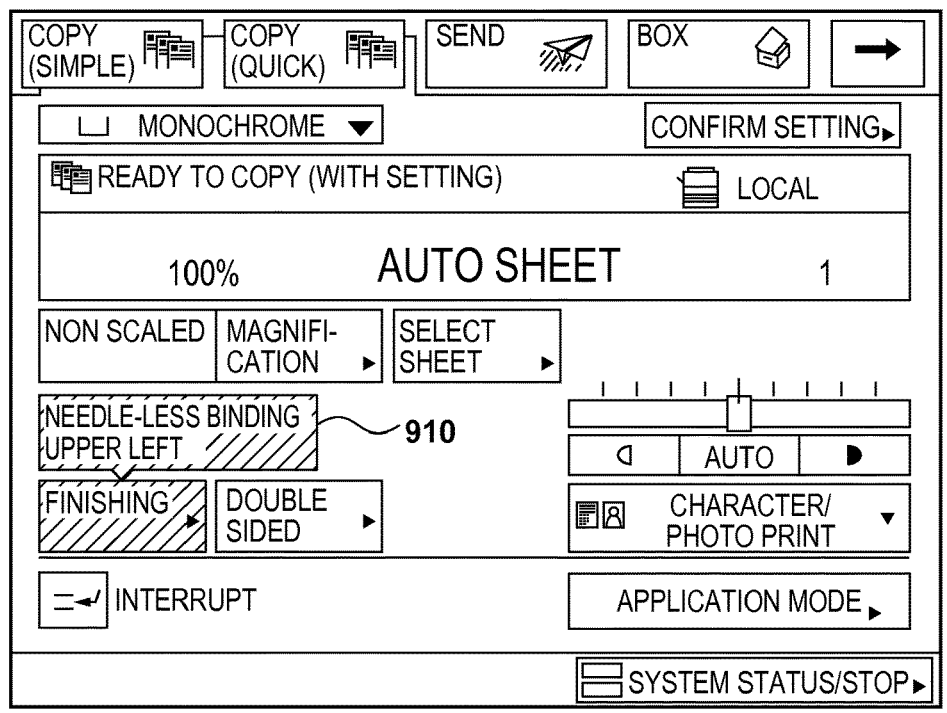

When the CPU 602 detects that an "OK" button 909 is pressed via the needle-less binding position selecting screen of FIG. 9E, the display is returned to a copy initial screen shown in FIG. 9F. In this state, as indicated by numeral 910, the display indicates that setting for needle-less binding at the upper left of sheets has been completed.

When the start key 706 of the console unit 701 is pressed in the state where the screen shown in FIG. 8E or 9F is thus displayed, the CPU 602 causes the scanner unit 301 to start a reading operation for an original while causing the printer unit 313 to start a printing operation according to the setting stored in the DRAM 606.

The operations described above allow the user to obtain a product having subjected to needle binding or needle-less binding of printed sheets.

Next, screen layouts in the case of executing needle binding and discharging sheets onto the stack tray 329 (FIG. 2) and the case of executing needle-less binding and discharging sheets onto the stack tray 329 are specifically described with reference to FIGS. 10A to 10D through FIGS. 17A to 17D.

FIGS. 10A to 10D are diagrams for describing a layout method for original images in the case of executing one-position needle binding at the upper left of printed sheets and discharging the bound sheets onto the stack tray 329 in a copy process in the multi-function peripheral according to the embodiment.

In the case where the original size is an A4 or B5 portrait size and sheets to be used for printing also have the portrait size as shown in FIG. 10A, the CPU 602 performs layout according to an order of input image data of the originals, and starts printing at a timing when layout of the first page is completed. A sheet bundle (product) discharged in face-down manner onto the stack tray 329 so as to orient the printed surface downward is as shown in FIG. 10A, because the binding position 3303 in FIG. 3 is adopted.

Next, in the case where the original size is an A4 or B5 portrait size as shown in FIG. 10A and sheets to be used for printing have an A4R, B5R, A3 or B4 landscape size as shown in FIG. 10B, the CPU 602 performs a 90-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 10B, because the binding position 3302 in FIG. 3 is adopted.

On the other hand, in the case where the original size is an A4R, B5R, A3 or B4 landscape size and sheets to be used for printing also have the landscape size as shown in FIG. 10C, the CPU 602 performs layout according to the order of input image data of the originals, and starts printing at a timing when layout of the first page is completed. A sheet bundle (product) discharged in a face-down manner onto the stack tray 329 so as to orient the printed surface downward is as shown in FIG. 10C, because the binding position 3303 in FIG. 3 is adopted.

Next, in the case where the original size is an A4R, B5R, A3 or B4 landscape size as shown in FIG. 10C and sheets to be used for printing have an A4 or B5 portrait size as shown in FIG. 10D, the CPU 602 performs a 90-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 10D, because the binding position 3302 in FIG. 3 is adopted.

FIGS. 11A to 11D are diagrams for describing a layout method for original images in the case of executing one-position needle binding at the upper right of printed sheets and discharging the bound sheets onto the stack tray 329 in a copy process in the multi-function peripheral according to the embodiment.

In the case where the original size is an A4 or B5 portrait size and sheets to be used for printing also have the portrait size as shown in FIG. 11A, the CPU 602 performs a 180-degree image rotating process according to the order of input image data of the originals. The CPU 602 starts printing at a timing when layout of the first page is completed. A sheet bundle (product) discharged in a face-down manner onto the stack tray 329 so as to orient the printed surface downward is as shown in FIG. 11A, because the binding position 3302 in FIG. 3 is adopted.

Next, in the case where the original size is an A4 or B5 portrait size as shown in FIG. 11A and sheets to be used for printing have an A4R, B5R, A3 or B4 landscape size as shown in FIG. 11B, the CPU 602 performs a 90-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 11B, because the binding position 3303 in FIG. 3 is adopted.

In the case where the original size is an A4R, B5R, A3 or B4 landscape size and sheets to be used for printing also have the landscape size as shown in FIG. 11C, the CPU 602 performs a 180-degree image rotating process according to the order of input image data of the originals. The CPU 602 starts printing at a timing when layout of the first page is completed. A sheet bundle (product) discharged in a face-down manner onto the stack tray 329 so as to orient the printed surface downward is as shown in FIG. 11C, because the binding position 3302 in FIG. 3 is adopted.

Next, in the case where the original size is an A4R, B5R, A3 or B4 landscape size as shown in FIG. 11C and sheets to be used for printing have an A4 or B5 portrait size as shown in FIG. 11D, the CPU 602 performs a 90-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 11D, because the binding position 3303 in FIG. 3 is adopted.

FIGS. 12A to 12D are diagrams for describing a layout method for original images in the case of executing one-position needle binding at the lower left of printed sheets and discharging the bound sheets onto the stack tray 329 in a copy process in the multi-function peripheral according to the embodiment.

In the case where the original size is an A4 or B5 portrait size and sheets to be used for printing also have the portrait size as shown in FIG. 12A, the CPU 602 performs layout according to the order of input image data of the originals. The CPU 602 starts printing at a timing when layout of the first page is completed. A sheet bundle (product) discharged in a face-down manner onto the stack tray 329 so as to orient the printed surface downward is as shown in FIG. 12A, because the binding position 3302 in FIG. 3 is adopted.

In the case where the original size is an A4 or B5 portrait size as shown in FIG. 12A and sheets to be used for printing have an A4R, B5R, A3 or B4 landscape size as shown in FIG. 12B, the CPU 602 performs a 270-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 12B, because the binding position 3303 in FIG. 3 is adopted.

In the case where the original size is an A4R, B5R, A3 or B4 landscape size and sheets to be used for printing also have the landscape size as shown in FIG. 12C, the CPU 602 performs layout according to the order of input image data of the originals. The CPU 602 starts printing at a timing when layout of the first page is completed. A sheet bundle (product) discharged in a face-down manner onto the stack tray 329 so as to orient the printed surface downward is as shown in FIG. 12C, because the binding position 3302 in FIG. 3 is adopted.

In the case where the original size is an A4R, B5R, A3 or B4 landscape size as shown in FIG. 12C and sheets to be used for printing have an A4 or B5 portrait size as shown in FIG. 12D, the CPU 602 performs a 270-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 12D, because the binding position 3303 in FIG. 3 is adopted.

FIGS. 13A to 13D are diagrams for describing a layout method for original images in the case of executing one-needle binding at the lower right of printed sheets and discharging the bound sheets onto the stack tray 329 in a copy process in the multi-function peripheral according to the embodiment.

In the case where the original size is an A4 or B5 portrait size and sheets to be used for printing also have the portrait size as shown in FIG. 13A, the CPU 602 performs a 180-degree image rotating process according to the order of input image data of the originals. The CPU 602 starts printing at a timing when layout of the first page is completed. A sheet bundle (product) discharged in a face-down manner onto the stack tray 329 so as to orient the printed surface downward is as shown in FIG. 13A, because the binding position 3303 in FIG. 3 is adopted.

Next, in the case where the original size is an A4 or B5 portrait size as shown in FIG. 13A and sheets to be used for printing have an A4R, B5R, A3 or B4 landscape size as shown in FIG. 13B, the CPU 602 performs a 270-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 13B, because the binding position 3302 in FIG. 3 is adopted.

In the case where the original size is an A4R, B5R, A3 or B4 landscape size and sheets to be used for printing also have the landscape size as shown in FIG. 13C, the CPU 602 performs a 180-degree image rotating process according to the order of input image data of the originals. The CPU 602 starts printing at a timing when layout of the first page is completed. A sheet bundle (product) discharged in a face-down manner onto the stack tray 329 so as to orient the printed surface downward is as shown in FIG. 13C, because the binding position 3303 in FIG. 3 is adopted.

In the case where the original size is an A4R, B5R, A3 or B4 landscape size as shown in FIG. 13C and sheets to be used for printing have an A4 or B5 portrait size as shown in FIG. 13D, the CPU 602 performs a 270-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 13D, because the binding position 3302 in FIG. 3 is adopted.

FIGS. 14A to 14D are diagrams for describing a layout method for original images in the case of executing needle-less binding at the upper left of printed sheets and discharging the bound sheets onto the stack tray 329 in a copy process in the multi-function peripheral according to the embodiment.

In the case where the original size is an A4 or B5 portrait size and sheets to be used for printing also have the portrait size as shown in FIG. 14A, the CPU 602 performs layout according to the order of input image data of the originals. The CPU 602 starts printing at a timing when layout of the first page is completed. A sheet bundle (product) discharged in a face-down manner onto the stack tray 329 so as to orient the printed surface downward is as shown in FIG. 14A, because the binding position 3303 in FIG. 3 is only adopted.

Next, in the case where the original size is an A4 or B5 portrait size as shown in FIG. 14A and sheets to be used for printing have an A4R, B5R, A3 or B4 landscape size as shown in FIG. 14B, the CPU 602 performs a 90-degree image rotating process in the clockwise direction according to the order of the input image data. The CPU 602 starts printing at a timing when layout of the last page is completed. At this time, printing is started from the last page so as to discharge the bound sheets in an order reversed from the order of the input image data. A sheet bundle (product) discharged in a face-up manner onto the stack tray 329 so as to orient the printed surface upward is as shown in FIG. 14B, because the binding position 3303 in FIG. 3 is only adopted.

In the case where the original size is an A4R, B5R, A3 or B4 landscape size and sheets to be used for printing also have the landscape size as shown in FIG. 14C, the CPU 602 performs layout according to the order of input image data of the originals, and starts printing at a timing when layout of the first page is completed. A sheet bundle (product) discharged in a face-down manner onto the stack tray 329 so as to orient the printed surface downward is as shown in FIG. 14C, because the binding position 3303 in FIG. 3 is only adopted.

Next, in the case where the original size is an A4R, B5R, A3 or B4 landscape size as shown in FIG. 14C and sheets to be used for printing have an A4 or B5 portrait size as shown in FIG. 14D, the CPU 602 performs a 90-degree image rotating process in the clockwise direction according to the order of the input image data. The CPU 602 starts printing at a timing when layout of the last page is completed. At this time, printing is started from the last page so as to discharge the sheets in an order reversed from the order of the input image data. A sheet bundle (product) discharged in a face-up manner onto the stack tray 329 so as to orient the printed surface upward is as shown in FIG. 14D, because the binding position 3303 in FIG. 3 is only adopted.

FIGS. 15A to 15D are diagrams for describing a layout method for original images in the case of executing needleless binding at the upper right of printed sheets and discharging the bund sheets onto the stack tray 329 in a copy process in the multi-function peripheral according to the embodiment.

In the case where the original size is an A4 or B5 portrait size and sheets to be used for printing also have the portrait size as shown in FIG. 15A, the CPU 602 performs layout according to the order of input image data of the originals, and starts printing at a timing when layout of the last page is completed. At this time, printing is started from the last page so as to discharge the sheets in an order reversed from the order of the input image data. A sheet bundle (product) discharged in a face-up manner onto the stack tray 329 so as to orient the printed surface upward is as shown in FIG. 15A, because the binding position 3303 in FIG. 3 is only adopted.

Next, in the case where the original size is an A4 or B5 portrait size as shown in FIG. 15A and sheets to be used for printing have an A4R, B5R, A3 or B4 landscape size as shown in FIG. 15B, the CPU 602 performs a 90-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 15B, because the binding position 3303 in FIG. 3 is only adopted.

In the case where the original size is an A4R, B5R, A3 or B4 landscape size and sheets to be used for printing also have the landscape size as shown in FIG. 15C, the CPU 602 performs layout according to the order of input image data of the originals, and starts printing at a timing when layout of the last page is completed. At this time, printing is started from the last page so as to discharge the sheets in an order reversed from the order of the input image data. A sheet bundle (product) discharged in a face-up manner onto the stack tray 329 so as to orient the printed surface upward is as shown in FIG. 15C, because the binding position 3303 in FIG. 3 is only adopted.

Next, in the case where the original size is an A4R, B5R, A3 or B4 landscape size as shown in FIG. 15C and sheets to be used for printing have an A4 or B5 portrait size as shown in FIG. 15D, the CPU 602 performs a 90-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 15D, because the binding position 3303 in FIG. 3 is only adopted.

FIGS. 16A to 16D are diagrams for illustrating a layout method for original images in the case of executing needleless binding at the lower left of printed sheets and discharging the bound sheets onto the stack tray 329 in a copy process in the multi-function peripheral according to the embodiment.

Figure 16A:
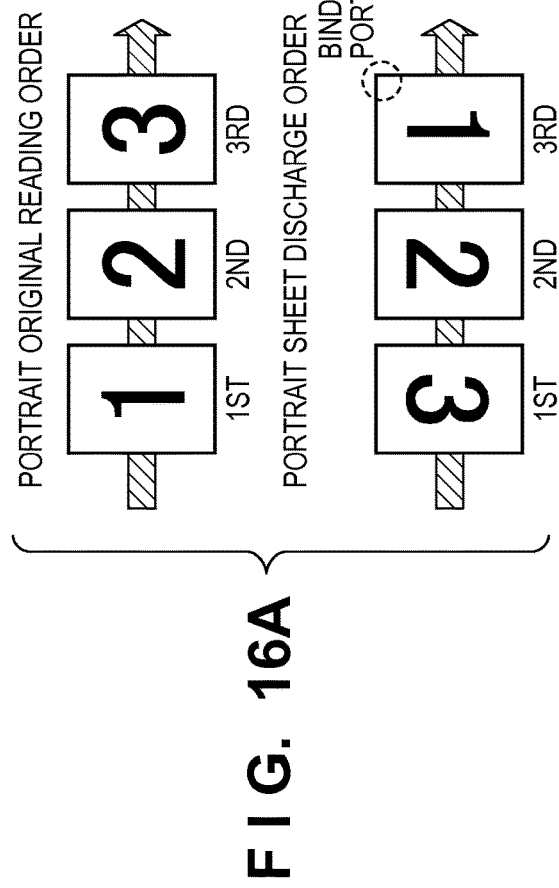

In the case where the original size is an A4 or B5 portrait size and sheets to be used for printing also have the portrait size as shown in FIG. 16A, the CPU 602 performs a 180-degree image rotating process according to the order of input image data of the originals. The CPU 602 starts printing at a timing when layout of the last page is completed. At this time, printing is started from the last page so as to discharge the sheets in an order reversed from the order of the input image data. A sheet bundle (product) discharged in a face-up manner onto the stack tray 329 so as to orient the printed surface upward is as shown in FIG. 16A, because the binding position 3303 in FIG. 3 is only adopted.

Figure 16B:
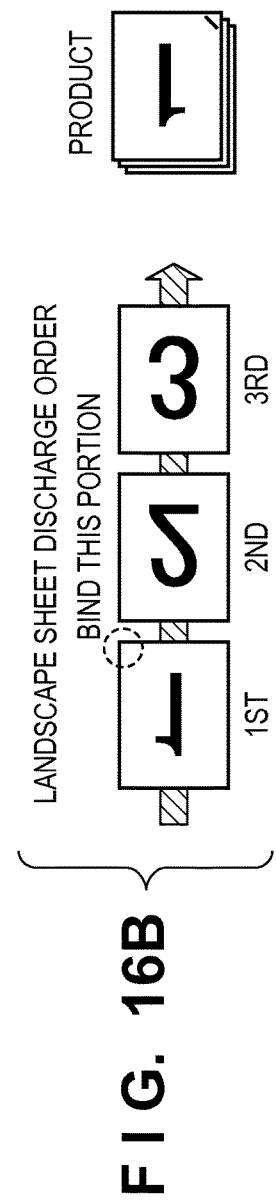

In the case where the original size is an A4 or B5 portrait size as shown in FIG. 16A and sheets to be used for printing have an A4R, B5R, A3 or B4 landscape size as shown in FIG. 16B, the CPU 602 performs a 270-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 16B, because the binding position 3303 in FIG. 3 is only adopted.

In the case where the original size is an A4R, B5R, A3 or B4 landscape size and sheets to be used for printing also have the landscape size as shown in FIG. 16C, the CPU 602 performs a 180-degree image rotating process according to the order of input image data of the originals. The CPU 602 starts printing at a timing when layout of the last page is completed. At this time, printing is started from the last page so as to discharge the sheets in an order reversed from the order of the input image data. A sheet bundle (product) discharged in a face-up manner onto the stack tray 329 so as to orient the printed surface upward is as shown in FIG. 16C, because the binding position 3303 in FIG. 3 is only adopted.

In the case where the original size is an A4R, B5R, A3 or B4 landscape size as shown in FIG. 16C and sheets to be used for printing have an A4 or B5 portrait size as shown in FIG. 16D, the CPU 602 performs a 270-degree image rotating process in the clockwise direction according to the order of the input image data. The CPU 602 starts printing at a timing when layout of the first page is completed. A sheet bundle (product) discharged in a face-down manner onto the stack tray 329 so as to orient the printed surface downward is as shown in FIG. 16D, because the binding position 3303 in FIG. 3 is only adopted.

FIGS. 17A to 17D are diagrams for describing a layout method for original images in the case of executing needleless binding at lower right of printed sheets and discharging the bound sheets onto the stack tray 329 in a copy process in the multi-function peripheral according to the embodiment.

In the case where the original size is an A4 or B5 portrait size and sheets to be used for printing also have the portrait size as shown in FIG. 17A, the CPU 602 performs a 180-degree image rotating process according to the order of input image data of the originals. The CPU 602 starts printing at a timing when layout of the first page is completed. A sheet bundle (product) discharged in a face-down manner onto the stack tray 329 so as to orient the printed surface downward is as shown in FIG. 17A, because the binding position 3303 in FIG. 3 is only adopted.

Next, in the case where the original size is an A4 or B5 portrait size as shown in FIG. 17A and sheets to be used for printing have an A4R, B5R, A3 or B4 landscape size as shown in FIG. 17B, the CPU 602 performs a 270-degree image rotating process in the clockwise direction according to the order of the input image data. The CPU 602 starts printing at a timing when layout of the last page is completed. At this time, printing is started from the last page so as to discharge the sheets in an order reversed from the order of the input image data. A sheet bundle (product) discharged in a face-up manner onto the stack tray 329 so as to orient the printed surface upward is as shown in FIG. 17B, because the binding position 3303 in FIG. 3 is only adopted.

In the case where the original size is an A4R, B5R, A3 or B4 landscape size and sheets to be used for printing also have the landscape size as shown in FIG. 17C, the CPU 602 performs a 180-degree image rotating process according to the order of input image data of the originals. The CPU 602 starts printing at a timing when layout of the first page is completed. A sheet bundle (product) discharged in a face-down manner onto the stack tray 329 so as to orient the printed surface downward is as shown in FIG. 17C, because the binding position 3303 in FIG. 3 is only adopted.

In the case where the original size is an A4R, B5R, A3 or B4 landscape size as shown in FIG. 17C and sheets to be used for printing have an A4 or B5 portrait size as shown in FIG. 17D, the CPU 602 performs a 270-degree image rotating process in the clockwise direction according to the order of the input image data. The CPU 602 starts printing at a timing when layout of the last page is completed. At this time, printing is started from the last page so as to discharge the sheets in an order reversed from the order of the input image data. A sheet bundle (product) discharged in a face-up manner onto the stack tray 329 so as to orient the printed surface upward is as shown in FIG. 17D, because the binding position 3303 in FIG. 3 is only adopted.

Next, referring to FIGS. 18 to 24, control procedures of the multi-function peripheral according to this embodiment are described. The CPU 602 executes each step described in flowcharts of FIGS. 18 to 24 by executing programs stored in the ROM 604.

Figure 18:
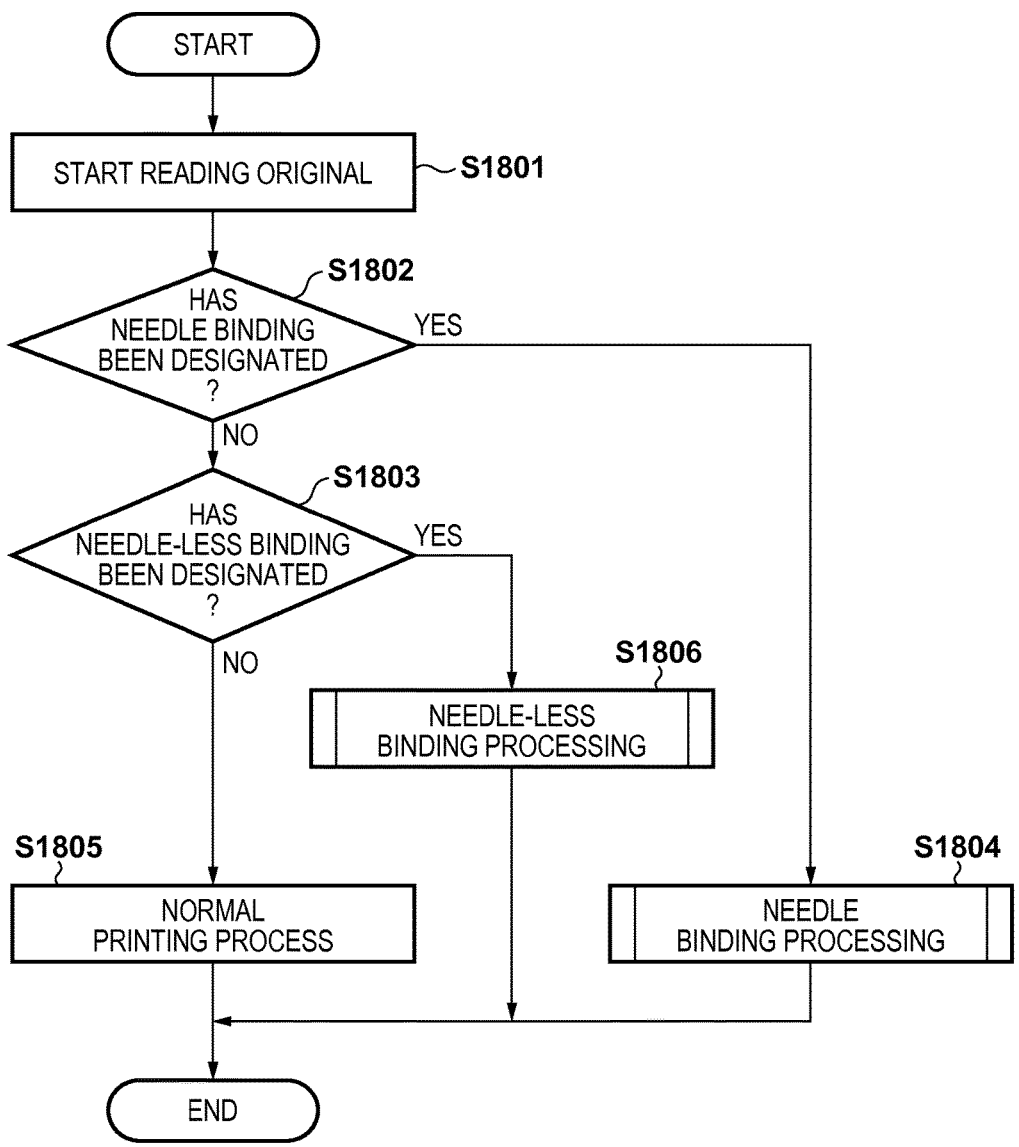
FIG. 18 is a flowchart for describing the copy process according to the multi-function peripheral according to the embodiment.

FIG. 18 is a flowchart for describing the copy process of the multi-function peripheral according to the embodiment. Processes described in this flowchart can be achieved by the CPU 602 executing the program stored in the ROM 604.

The processes as shown in FIG. 18 is launched when a user sets an original in the scanner unit 301, performs various setting via, for example, the copy initial screen of FIG. 8A, and presses the start key 706 on the console unit 701.

Figure 19A:
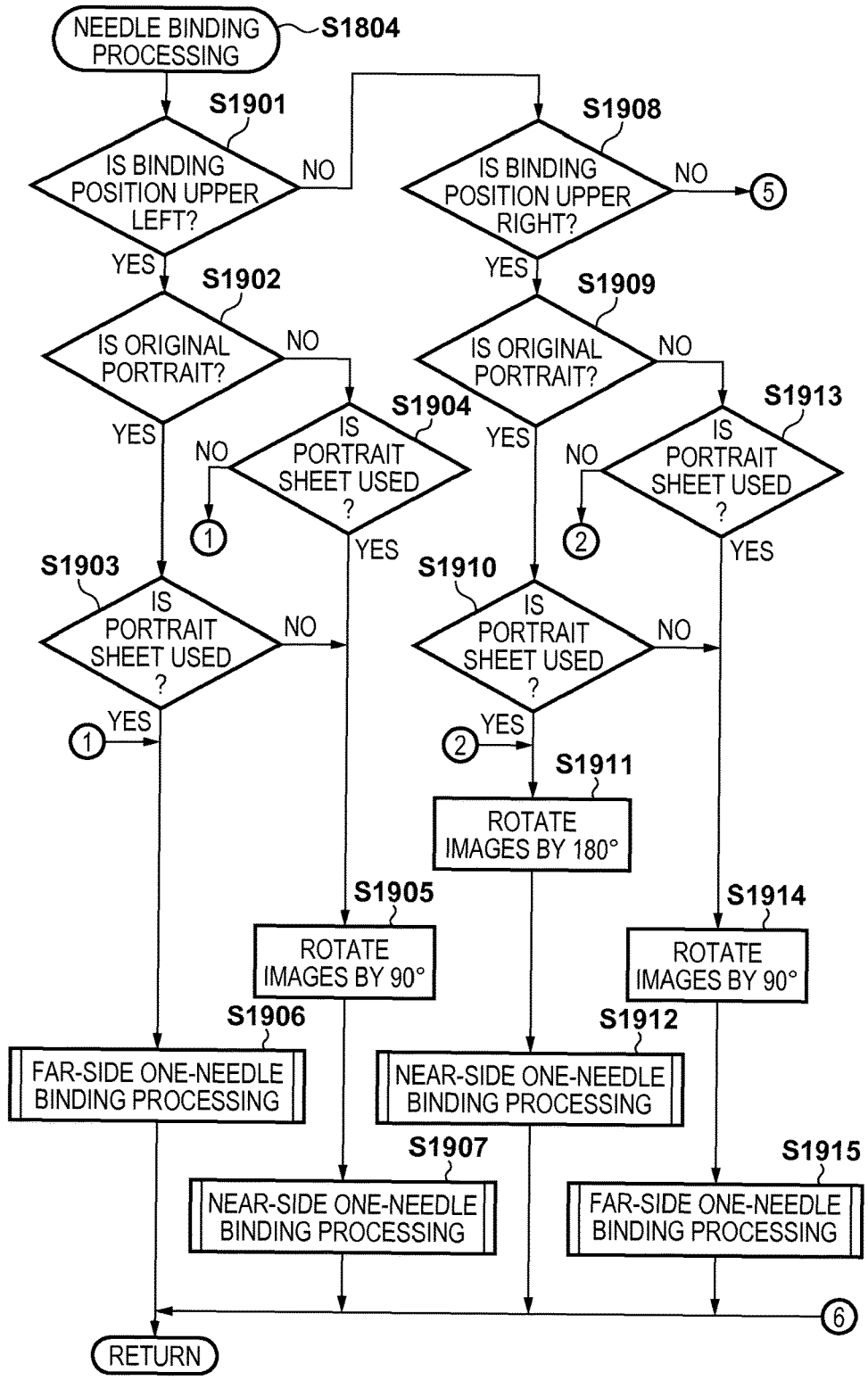
FIGS. 19A and 19B are flowcharts for describing procedures of needle binding process in step S1804 of FIG. 18.
Figure 19B:
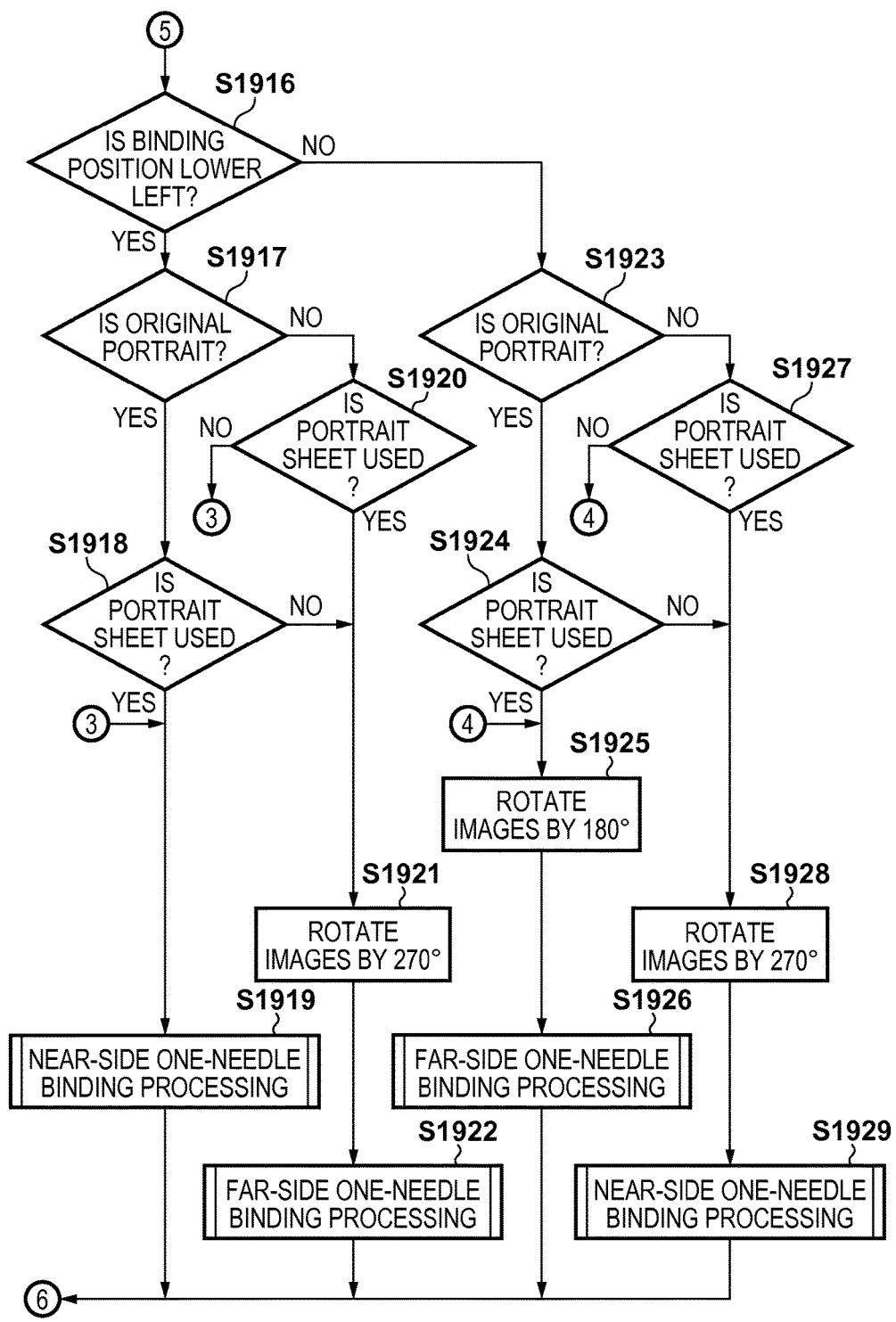
Figure 22A:
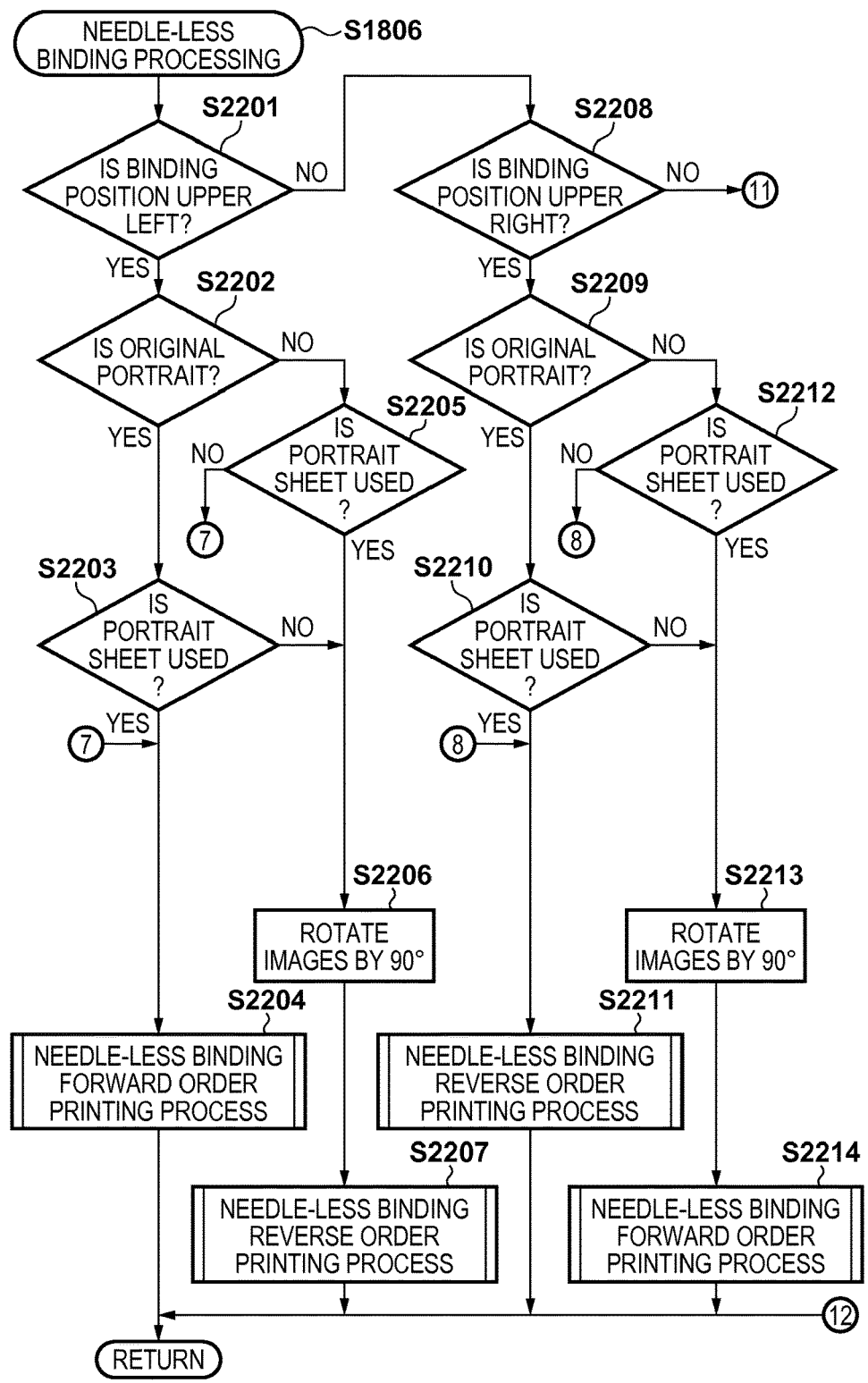
FIGS. 22A and 22B are flowcharts for describing procedures of needle-less binding process in step S1806 of FIG. 18.
Figure 22B:
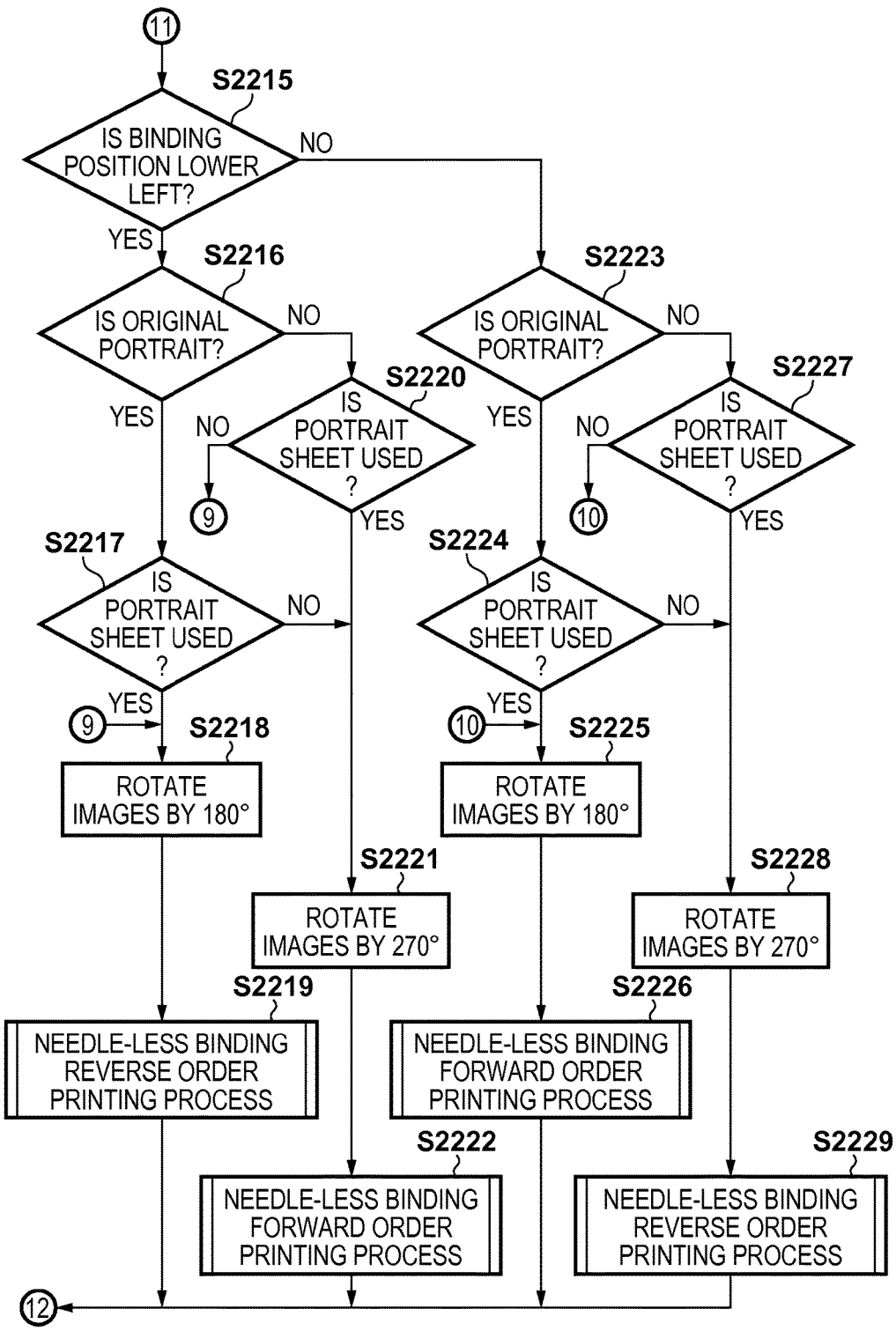

First, in step S1801, the CPU 602 controls the scanner unit 301 to start a process of reading the original. Next, the processing proceeds to step S1802, the CPU 602 determines whether needle binding has been designated via, for example, the screens of FIG. 8B or not. If it is determined in step S1802 that the needle binding has been designated, the processing proceeds to step S1804. The CPU 602 executes needle binding process as shown in FIGS. 19A and 19B, and finishes the processes. On the contrary, if it is determined in step S1802 that the needle binding has not been designated, the processing proceeds to step S1803. The CPU 602 determines whether needle-less binding has been designated or not. If it is determined that the needle-less binding has been designated, the processing proceeds to step S1806. The CPU 602 executes the needle-less binding process as shown in FIGS. 22A and 22B, and finishes the processes. On the contrary, if it is determined that in step S1803 that the needle-less binding has not been designated, the processing proceeds to step S1805, and the CPU 602 executes normal printing process on the basis of setting that is other than the staple process and has been accepted from the user. This process is in the case, for example, where no post-process is executed by the finisher 315 but printing is performed by the multi-function peripheral to output sheets.

FIGS. 19A and 19B are flowcharts for describing the procedures of the needle binding process in step S1804 of FIG. 18.

Figure 20:
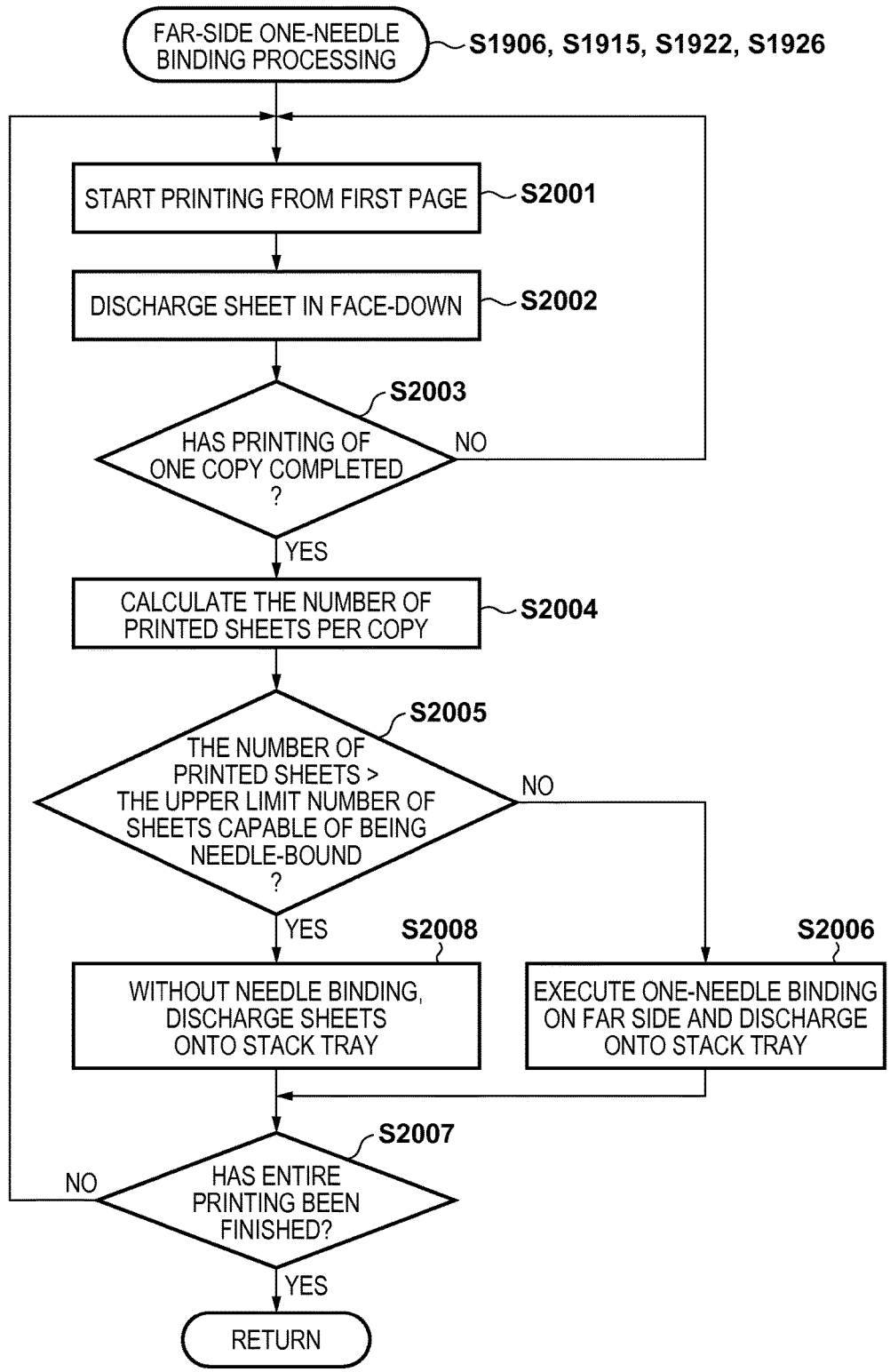
FIG. 20 is a flowchart for describing procedures of far-side one-needle binding process in steps S1906, S1915, S1922 and S1926 of FIGS. 19A and 19B.

First, in step S1901 of FIG. 19A, the CPU 602 determines whether a needle binding position is upper left of the sheets or not. Upon determination in step S1901 that the binding position is the upper left, the CPU 602 advances the processing to step S1902. Upon determination that the binding position is not the upper left, the processing proceeds to step S1908. In step S1902, the CPU 602 determines whether the size of the original is A4 or B5 portrait size or not. If it is determined here that the size of the original is portrait size, the CPU 602 advances the processing to step S1903. If it is determined that the size of the original is not portrait size, for example, is A4R, B5R, A3 or B4 landscape size, the processing proceeds to step S1904. In step S1903, the CPU 602 determines whether a sheet to be used for printing has the portrait size or not. Upon determination here that the sheet has the portrait size, the CPU 602 advances the processing to S1906. If it is determined in step S1903 that the sheet does not have the portrait size, that is, has landscape size, the processing proceeds to step S1905. In step S1906, the CPU 602 executes far-side one-needle binding process as shown in FIG. 20, and finishes the needle binding process.

Figure 21:
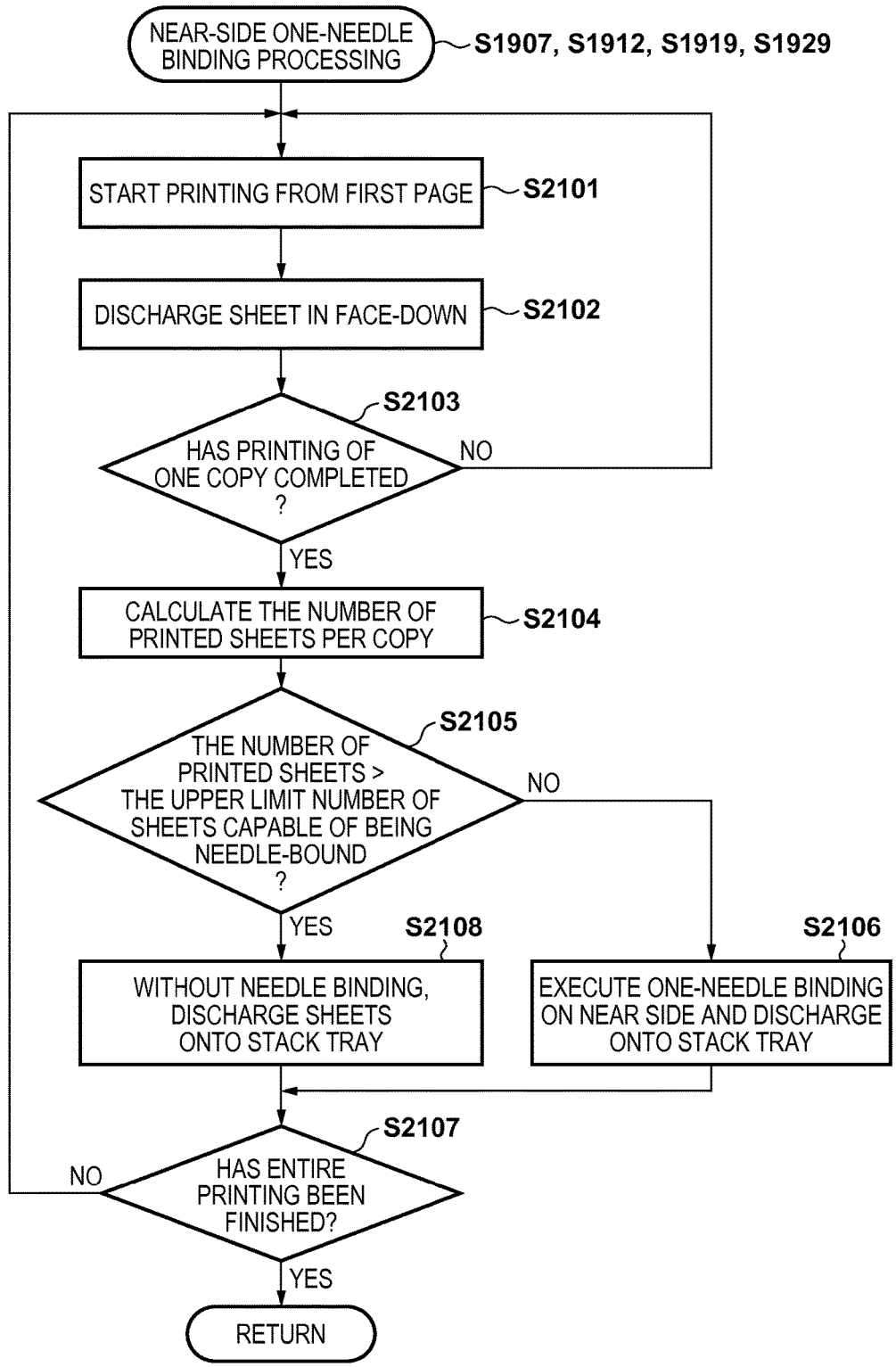
FIG. 21 is a flowchart for describing procedures of near-side one-needle binding process in steps S1907, S1912, S1919 and S1929 of FIGS. 19A and 19B.

If it is determined that in step S1902 that the original has the landscape size, the processing proceeds to step S1904. The CPU 602 determines in step S1904 whether a sheet to be used for printing has the portrait size or not. If the CPU 602 determines here that the sheet has the portrait size, the processing proceeds to step S1905. In the other case, that is, if it is determined that the sheet for printing has the landscape size, the processing proceeds to step S1906. In step S1905, the CPU 602 performs a rotation process of rotating the input image data by 90 degrees in clockwise direction, and the processing proceeds to step S1907. In step S1907, the CPU 602 executes near-side one-needle binding process as shown in FIG. 21, and finishes the needle binding process.

In step S1908, the CPU 602 determines whether the needle binding position is upper right of the sheets or not. Upon determination that the binding position is the upper right, the CPU 602 advances the processing to S1909. If it is determined in step S1908 that the binding position is not the upper right, the processing proceeds to step S1916 (FIG. 19B). In step S1909, the CPU 602 determines whether the size of the original is A4 or B5 portrait size or not. Upon determination in step S1909 that the size of the original is the portrait size, the CPU 602 advances the processing to S1910. If it is determined that the size of the original is A4R, B5R, A3 or B4 landscape size, the processing proceeds to step S1913. In step S1910, the CPU 602 determines whether a sheet to be used for printing has the portrait size or not. Upon determination in step S1910 that the sheet has the portrait size, the CPU 602 advances the processing to S1911. If it is determined in step S1910 that the sheet has the landscape size, the processing proceeds to step S1914. In step S1913, the CPU 602 determines whether a sheet to be used for printing has the portrait size or not. If the CPU 602 determines that the sheet has the portrait size, the CPU 602 advances the processing to S1914. In step S1911, the CPU 602 performs a rotation process of rotating the input image data by 180 degrees in the clockwise direction, and advances the processing to step S1912. In step S1912, the CPU 602 executes the near-side one-needle binding process as shown in FIG. 21, and finishes the needle binding process. On the other hand, in step S1914, the CPU 602 performs the rotation process of rotating the input image data by 90 degrees in the clockwise direction, and advances the processing to step S1915. The CPU 602 executes the far-side one-needle binding process as shown in FIG. 20 in step S1915, and finishes the needle binding process.

On the other hand, in step S1916 (FIG. 19B), the CPU 602 determines whether the needle binding position is lower left or not. Upon determination here that the binding position is the lower left, the CPU 602 advances the processing to S1917. If it is determined that the binding position is not the lower left, the processing proceeds to step S1923. In step S1917, the CPU 602 determines whether the size of the original is A4 or B5 portrait size or not. Upon determination here that the size of the original is the portrait size, the CPU 602 advances the processing to S1918. If it is determined that the size of the original is A4R, B5R, A3 or B4 landscape size, the processing proceeds to step S1920. In step S1918, the CPU 602 determines whether a sheet to be used for printing has the portrait size or not. Upon determination here that the sheet has the portrait size, the CPU 602 advances the processing to S1919. If it is determined that the sheet has the landscape size, the processing proceeds to step S1921.

In step S1920, the CPU 602 determines whether a sheet to be used for printing has the portrait size or not. If the CPU 602 determines that the sheet has the portrait size, the processing proceeds to step S1921. If it is determined that the sheet used for printing has the landscape size, the processing proceeds to step S1919. In step S1919, the CPU 602 executes the near-side one-needle binding process as shown in FIG. 21, and finishes the needle binding process. On the other hand, in step S1921, the CPU 602 performs a rotation process of rotating the input image data by 270 degrees in the clockwise direction, and advances the processing to step S1922. In step S1922, the CPU 602 executes the far-side one-needle binding process as shown in FIG. 20, and finishes the needle binding process.

In step S1923, the CPU 602 determines whether the size of the original is A4 or B5 portrait size or not. Upon determination that the size of the original is the portrait size, the CPU 602 advances the processing to S1924. If it is determined that the size of the original is A4R, B5R, A3 or B4 landscape size, the processing proceeds to step S1927. In step S1924, the CPU 602 determines whether a sheet to be used for printing has the portrait size or not. Upon determination that the sheet has the portrait size, the CPU 602 advances the processing to S1925. If it is determined that the sheet has the landscape size, the processing proceeds to step S1928.

If the processing proceeds to step S1927, then the CPU 602 determines whether a sheet to be used for printing has the portrait size or not. Upon determination that the sheet has the portrait size, the CPU 602 advances the processing to S1928. If it is determined that the sheet has the landscape size, the processing proceeds to step S1925. In step S1925, the CPU 602 performs the rotation process of rotating the input image data by 180 degrees, and advances the processing to step S1926. The CPU 602 executes the far-side one-needle binding process as shown in FIG. 20, and finishes the needle binding process. In step S1928, the CPU 602 executes the rotation process of rotating the input image data by 270 degrees in the clockwise direction, and advances the processing to step S1929. In step S1929, the CPU 602 executes the near-side one-needle binding process as shown in FIG. 21, and finishes the needle binding process.

FIG. 20 is a flowchart for describing procedures of the far-side one-needle binding process in steps S1906, S1915, S1922 and S1926 of FIGS. 19A and 19B.

First, in step S2001, the CPU 602 starts printing at a timing when the layout of the first page is completed, and advances the processing to step S2002. In step S2002, the CPU 602 discharges the sheets, on which an image is printed, in a face-down manner onto the process tray 520 (FIG. 2) so as to orient the printed surface downward, and advances the processing to step S2003. The CPU 602 determines whether printing of one copy has been completed or not. If it is determined that the printing of one copy has been completed, the processing proceeds to step S2004. If it is determined that the printing of one copy has not been completed, the processing returns to the process in step S2001.

In step S2004, the CPU 602 calculates the number of printed sheets per copy, and advances the processing to step S2005. The CPU 602 determines in step S2005 whether the number of printed sheets per copy exceeds the upper limit number of sheets capable of being needle-bound or not. Upon determination that the upper limit number of sheets is exceeded, the CPU 602 advances the processing to S2008. If it is determined that the upper limit number of sheets is not exceeded, the processing proceeds to step S2006. In step S2008, the CPU 602 discharges the sheet bundle stacked on the process tray 520 onto the stack tray 329 without executing the one-needle binding, and subsequently advances the processing to step S2007. On the other hand, in step S2006, the CPU 602 causes the stapler 523 to execute the one-needle binding to the sheet bundle stacked on the process tray 520 around the trailing edge of the sheets on the far side, and discharges the bundle onto the stack tray 329, and subsequently advances the processing to step S2007. In step S2007, the CPU 602 determines whether the entire printing has been completed or not. If it is determined that the entire printing has been completed, the CPU 602 finishes the far-side one-needle binding process, and returns the processing to the original routine. On the contrary, if it is determined in step S2007 that the entire printing has not been completed, the processing returns to the process in step S2001.

FIG. 21 is a flowchart for describing procedures of the near-side one-needle binding process in steps S1907, S1912, S1919, and S1929 of FIG. 19.

First, in step S2101, the CPU 602 starts printing at a timing when the layout of the first page is completed, and advances the processing to step S2102. In step S2102, the CPU 602 discharges the sheets, on which an image is printed, in a face-down manner onto the process tray 520 so as to orient the printed surface downward, and advances the processing to step S2103. In step S2103, the CPU 602 determines whether printing of one copy has been completed or not. If it is determined that the printing of one copy has been completed, the CPU 602 advances the processing to step S2104. If it is determined that printing of one copy has not been completed, the processing returns to the process in step S2101.

In step S2104, the CPU 602 calculates the number of printed sheets per copy, and advances the processing to step S2105. The CPU 602 determines in step S2105 whether the number of printed sheets per copy exceeds the upper limit number of sheets capable of being needle-bound or not. Upon determination in step S2105 that the upper limit number of sheets is exceeded, the CPU 602 advances the processing to S2108. Upon determination that the upper limit number of sheets is not exceeded, the processing proceeds to step S2106. In step S2108, the CPU 602 discharges the sheet bundle stacked on the process tray 520 onto the stack tray 329 without executing the one-needle binding, and then advances the processing to step S2107. On the other hand, in step S2106, the CPU 602 causes the stapler 523 to execute the one-needle binding to the sheet bundle stacked on the process tray 520 around the trailing edge of the sheets on the near side, and discharges the bundle onto the stack tray 329, and subsequently, advances the processing to step S2107. In step S2107, the CPU 602 determines whether the entire printing has been completed or not. Upon determination that the entire printing has been completed, the CPU 602 finishes the near-side one-needle binding process. On the contrary, upon determination that the entire printing has not been completed, the processing returns to the process in step S2101.

FIGS. 22A and 22B are flowcharts for describing procedures of the needle-less binding process in step S1806 of FIG. 18.

First, in step S2201 of FIG. 22A, the CPU 602 determines whether the binding position of the needle-less binding is upper left or not. Upon determination that the binding position is the upper left, the CPU 602 advances the processing to S2202. Upon determination that the binding position is not the upper left, the processing proceeds to step S2208. In step S2202, the CPU 602 determines whether the size of the original is A4 or B5 portrait size or not. Upon determination in step S2202 that the size of the original is the portrait size, the CPU 602 advances the processing to S2203. Upon determination that the size of the original is A4R, B5R, A3 or B4 landscape size, the processing proceeds to step S2205. In step S2203, the CPU 602 determines whether a sheet to be used for printing has the portrait size or not. Upon determination that the sheet has the portrait size, the processing proceeds to step S2204. Upon determination that the sheet has the landscape size, the processing proceeds to step S2206.

Figure 24:
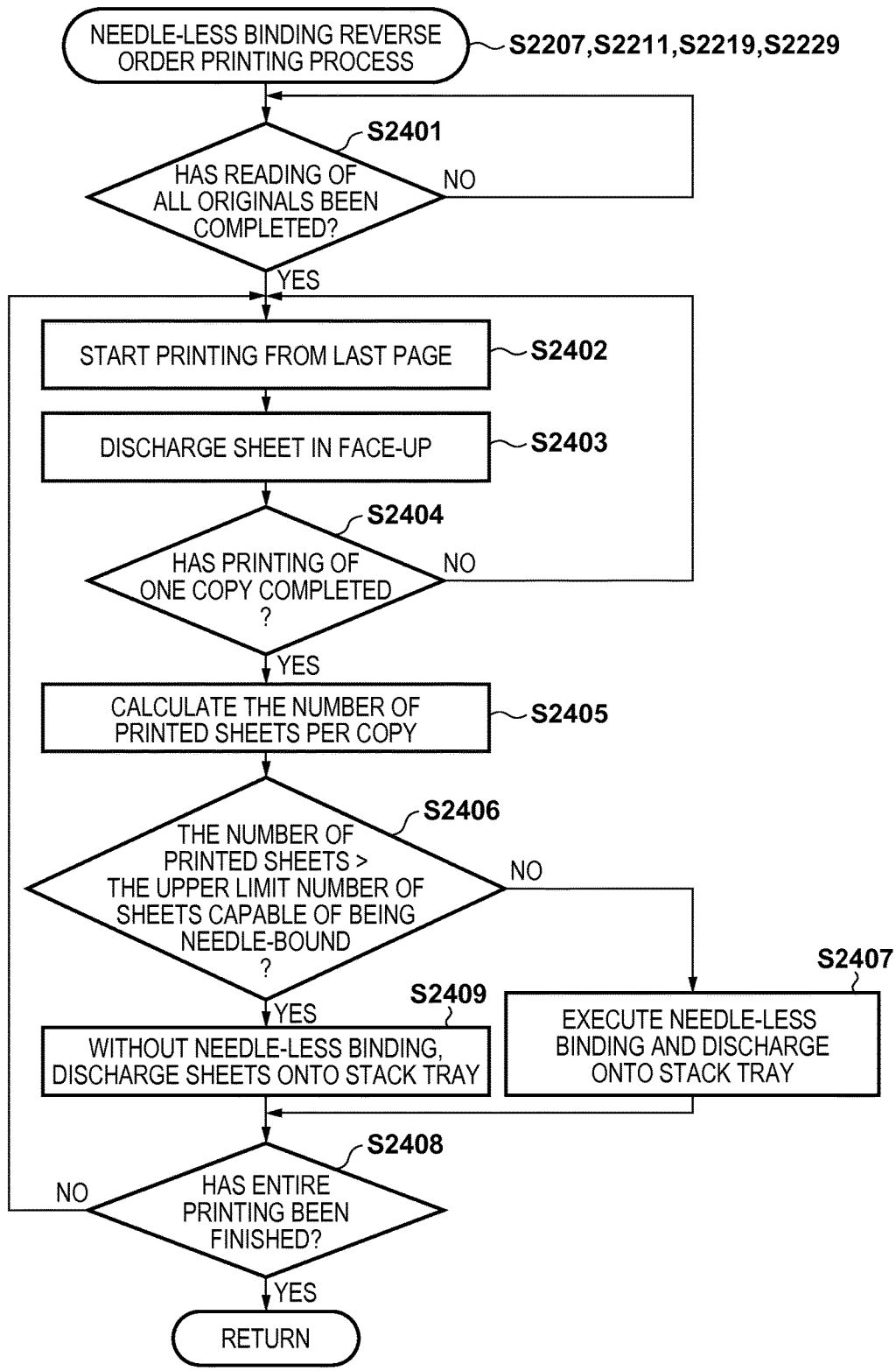
FIG. 24 is a flowchart for describing procedures of a needle-less binding reverse order printing process in steps S2207, S2211, S2219 and S2229 of FIGS. 22A and 22B.

In step S2205, the CPU 602 determines whether a sheet to be used for printing has the portrait size or not. Upon determination that the sheet has the portrait size, the CPU 602 advances the processing to S2206. Upon determination that the sheet has the landscape size, the processing proceeds to step S2204. In step S2204, the CPU 602 executes needle-less binding forward order printing process as shown in FIG. 23, and finishes the needle-less binding process. On the other hand, in step S2206, the CPU 602 performs the rotation process of rotating the input image data by 90 degrees in the clockwise direction, and advances the processing to step S2207. In step S2207, the CPU 602 executes needle-less binding reverse order printing process as shown in FIG. 24, and finishes the needle-less binding process.

On the other hand, in step S2208, the CPU 602 determines whether the binding position of the needle-less binding is upper right or not. Upon determination that the binding position is the upper right, the CPU 602 advances the processing to S2209. Upon determination that the binding position is not the upper right, the processing proceeds to step S2215 (FIG. 22B). In step S2209, the CPU 602 determines whether the size of the original is the A4 or B5 portrait size or not. Upon determination that the size of the original has the portrait size, the CPU 602 advances the processing to S2210. Upon determination in step S2209 that the size of the original has A4R, B5R, A3 or B4 landscape size, the processing proceeds to step S2212. In step S2212, the CPU 602 determines whether a sheet to be used for printing has the portrait size or not. Upon determination that the sheet has the portrait size, the CPU 602 advances the processing to step S2213. Upon determination that the sheet has the landscape size, the processing proceeds to step S2211.

In step S2210, the CPU 602 determines whether a sheet to be used for printing has the portrait size or not. Upon determination that the sheet has the portrait size, the CPU 602 advances the processing to step S2211. Upon determination that the sheet has the landscape size, the processing proceeds to step S2213. In step S2211, the CPU 602 executes the needle-less binding reverse order printing process as shown in FIG. 24, and finishes the needle-less binding process. On the other hand, in step S2213, the CPU 602 performs the rotation process of rotating the input image data by 90 degrees in the clockwise direction, and advances the processing to step S2214. In step S2214, the CPU 602 executes the needle-less binding forward order printing process as shown in FIG. 23, and finishes the needle-less binding process.

On the other hand, in step S2215 (FIG. 22B), the CPU 602 determines whether the binding position of the needle-less binding is lower left or not. Upon determination that the binding position is the lower left, the CPU 602 advances the processing to S2216. Upon determination that the binding position is not the lower left, the processing proceeds to step S2223. In step S2216, the CPU 602 determines whether the size of the original is A4 or B5 portrait size or not. Upon determination that the size of the original has the portrait size, the CPU 602 advances the processing to S2217. Upon determination that the size of the original has A4R, B5R, A3 or B4 landscape size, the processing proceeds to step S2220. In step S2217, the CPU 602 determines whether a sheet to be used for printing has the portrait size or not. Upon determination that the sheet has the portrait size, the CPU 602 advances the processing to S2218. Upon determination that the sheet has the landscape size, the processing proceeds to step S2221.

On the other hand, in step S2220, the CPU 602 determines whether a sheet to be used for printing has the portrait size or not. Upon determination that the sheet has the portrait size, the CPU 602 advances the processing to S2221. In step S2218, the CPU 602 performs the rotation process of rotating the input image data by 180 degrees, and advances the processing to step S2219. In step S2219, the CPU 602 executes the needle-less binding reverse order printing process as shown in FIG. 24, and finishes the needle-less binding process. On the other hand, in step S2221, the CPU 602 performs the rotation process of rotating the input image data by 270 degrees in the clockwise direction, and advances the processing to step S2222. In step S2222, the CPU 602 executes the needle-less binding forward order printing process as shown in FIG. 23, and finishes the needle-less binding process.

On the other hand, in step S2223, the CPU 602 determines whether the size of the original is A4 or B5 portrait size or not. Upon determination that the size of the original has the portrait size, the CPU 602 advances the processing to S2224. Upon determination that the size of the original has A4R, B5R, A3 or B4 landscape size, the processing proceeds to step S2227. In step S2224, the CPU 602 determines whether a sheet to be used for printing has the portrait size or not. Upon determination that the sheet has the portrait size, the CPU 602 advances the processing to S2225. Upon determination that the sheet has the landscape size, the processing proceeds to step S2228. In step S2227, the CPU 602 determines whether a sheet to be used for printing has the portrait size or not. Upon determination that the sheet has the portrait size, the CPU 602 advances the processing to S2228. Upon determination that the sheet has the landscape size, the processing proceeds to step S2225. In step S2225, the CPU 602 performs the rotation process of rotating the input image data by 180 degrees, and advances the processing to step S2226. In step S2226, the CPU 602 executes the needle-less binding forward order printing process as shown in FIG. 23, and finishes the needle-less binding process. On the other hand, in step S2228, the CPU 602 performs the rotation process of rotating the input image data by 270 degrees in the clockwise direction, and advances the processing to step S2229. In step S2229, the CPU 602 executes the needle-less binding reverse order printing process as shown in FIG. 24, and finishes the needle-less binding process.

FIG. 23 is a flowchart for describing procedures of the needle-less binding forward order printing process in steps S2204, S2214, S2222 and S2226 of FIG. 22.

First, in step S2301, the CPU 602 starts printing at a timing when the layout of the first page is completed, and advances the processing to step S2302. In step S2302, the CPU 602 discharges a sheet, on which an image is printed, in a face-down manner onto the process tray 520 so as to orient the printed surface downward, and advances the processing to step S2303. In step S2303, the CPU 602 determines whether printing of one copy has been completed or not. If it is determined that the printing of one copy has been completed, the CPU 602 advances the processing to step S2304. If it is determined that the printing of one copy has not been completed, the processing returns to the process in step S2301.

In step S2304, the CPU 602 calculates the number of printed sheets per copy, and advances the processing to step S2305. In step S2305, the CPU 602 determines whether the number of printed sheets per copy exceeds the upper limit number of sheets capable of being needle-less-bound or not. Upon determination in step S2305 that the upper limit number of sheets is exceeded, the CPU 602 advances the processing to S2308. Upon determination that the upper limit number of sheets is not exceeded, the processing proceeds to step S2306. In step S2308, the CPU 602 discharges the sheet bundle stacked on the process tray 520 onto the stack tray 329 without executing the needle-less-binding, and subsequently advances the processing to step S2307. On the other hand, in step S2306, the CPU 602 causes the binder 590 to execute the needle-less binding to the sheet bundle stacked on the process tray 520 around the trailing edge of the sheets on the far side, and discharges the bundle onto the stack tray 329, and subsequently, advances the processing to step S2307. In step S2307, the CPU 602 determines whether the entire printing has been completed or not. If it is determined that the entire printing has been completed, the CPU 602 finishes the needle-less binding forward order printing process. On the contrary, if it is determined that the entire printing has not been completed, the processing returns to the process in step S2301.

FIG. 24 is a flowchart for describing procedures of the needle-less binding reverse order printing process in steps S2207, S2211, S2219 and S2229 of FIG. 22.

First, in step S2401, the CPU 602 determines whether reading operation for all the originals has been completed or not. Upon determination that the reading operation for all the originals has been completed, the CPU 602 advances the processing to S2402, and starts printing at a timing when layout of the last page is completed. At this time, printing is started from the last page so as to discharge sheets in an order reversed from the input order of the image data. Next, the processing proceeds to step S2403. The CPU 602 discharges a sheet, on which an image is printed, in a face-up manner onto the process tray 520 so as to orient the printed surface upward, and advances the processing to step S2404. In step S2404, the CPU 602 determines whether printing of one copy has been completed or not. Upon determination that the printing of one copy has been completed, the CPU 602 advances the processing to S2405. Upon determination that the printing of one copy has not been completed, the processing returns to the process in step S2402.

In step S2405, the CPU 602 calculates the number of printed sheets per copy, and advances the processing to step S2406. In step S2406, the CPU 602 determines whether the number of printed sheets per copy exceeds the upper limit number of sheets capable of being needle-less-bound or not. Upon determination in step S2406 that the upper limit number of sheets is exceeded, the CPU 602 advances the processing to S2409. Upon determination that the upper limit number of sheets is not exceeded, the processing proceeds to step S2407. In step S2409, the CPU 602 discharges the sheet bundle stacked on the process tray 520 onto the stack tray 329 without executing the needle-less binding, and then advances the processing to step S2408. On the other hand, in step S2407, the CPU 602 causes the binder 590 to execute the needle-less binding to the sheet bundle stacked on the process tray 520 around the trailing edge of the sheets on the far side, and discharges the bundle onto the stack tray 329, and then advances the processing to step S2408. In step S2408, the CPU 602 determines whether the entire printing has been completed or not. Upon determination that the entire printing has been completed, the CPU 602 finishes the needle-less binding reverse order printing process. On the contrary, upon determination that the entire printing has not been completed, the processing returns to the process in step S2402.

As described above, this embodiment can adopt an image rotation process optimal to needle binding and needle-less binding, and forward order printing or reverse order printing, according to the setting direction of originals, the binding position, and the setting direction of sheets to be used for printing. The convenience of the user can thus be improved during execution of the needle binding process or the needle-less binding process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-113346, filed May 30, 2014, which is hereby incorporated by reference herein in its entirety.

What is claimed is:

1. A printing apparatus, comprising:
   a printing unit that prints an image based on an image of an original, on a sheet;
   a discharge unit that discharges the sheet on which an image is printed by the printing unit in a face-down manner in which a printed surface of the sheet is downward or in a face-up manner in which the printed surface of the sheet is upward;
   a tray that stacks a plurality of sheets discharged by the discharge unit as a sheet bundle;
   a first binding unit that is able to move to a plurality of positions and performs a first binding process using a staple at any one of two corner positions of a trailing edge side, in a conveyance direction of the sheets, of the sheet bundle stacked on the tray;
   a second binding unit that performs a second binding process without a staple at a single corner position of the trailing edge side, in the conveyance direction of the sheets, of the sheet bundle stacked on the tray;
   a first selector configured to select one of the first binding process and the second binding process as a binding process to be performed;
   a second selector configured to select a corner position of the sheet bundle on which the first or second binding process is to be performed, the corner position including a first corner position and a second corner position that is not diagonally opposite to the first corner position; and
   a controller that,
   (i) in a case that an orientation of the sheet is the same as an orientation of the original and the first binding process is selected but the second binding process is not selected by the first selector, determines to discharge the plurality of sheets to be discharged on the tray regardless of whether the second selector selects the first corner position of the sheet bundle or the second corner position of the sheet bundle, and controls the discharge unit to discharge the plurality of sheets in the face-down manner, and
   (ii) in a case that an orientation of the sheet is the same as an orientation of the original and the second binding process is selected but the first binding process is not selected by the first selector, determines to discharge the plurality of sheets on the tray in the face-down manner or in the face-up manner based on whether the second selector selects the first corner position of the sheet bundle or the second corner position of the sheet bundle, and controls the discharge unit to discharge the plurality of sheets in accordance with a determined result.

2. The printing apparatus according to claim 1, wherein the second binding unit is movable, and a distance in which the second binding unit is able to move is less than a distance in which the first binding unit is able to move.

3. The printing apparatus according to claim 1, wherein the second binding unit has a first member and a second member each having a concavo-convex shape, the second binding unit binds the sheet bundle by applying pressure to both sides of the sheet bundle using the first and second members.

4. The printing apparatus according to claim 1, wherein in a case that the second binding process is selected but the first binding process is not selected by the first selector and a upper left corner position or a lower right corner position of the sheet bundle is selected by the second selector, the controller determines to discharge the plurality of sheets to be discharged on the tray in the face-down manner.

5. The printing apparatus according to claim 4, wherein the controller controls the printing unit to print in the same order as an input order of a plurality of originals.

6. The printing apparatus according to claim 4, wherein in a case that the second binding process is selected but the first binding process is not selected by the first selector and the lower right corner position of the sheet bundle is selected by the second selector, the controller controls the printing unit to print a 180-degree rotated image.

7. The printing apparatus according to claim 1, wherein in a case that the second binding process is selected but the first binding process is not selected by the first selector and a upper right corner position or a lower left corner position of the sheet bundle is selected by the second selector, the controller determines to discharge the plurality of sheets to be discharged on the tray in the face-up manner.

8. The printing apparatus according to claim 7, wherein the controller controls the printing unit to print in an inverse order of an input order of a plurality of originals.

9. The printing apparatus according to claim 7, wherein in a case that the second binding process is selected but the first binding process is not selected by the first selector and the lower left corner position of the sheet bundle is selected by the second selector, the controller controls the printing unit to print a 180-degree rotated image.

10. The printing apparatus according to claim 1, wherein an orientation of the original is portrait and an orientation of the sheet is portrait.

11. The printing apparatus according to claim 10, wherein a sheet size of the portrait includes is selected from a group including A4 and B5 sizes.

12. The printing apparatus according to claim 1, wherein an orientation of the original is landscape and an orientation of the sheet is landscape.

13. The printing apparatus according to claim 12, wherein a sheet size of the landscape includes is selected from a group including A4R, B5R, A3 and B4 sizes.

14. A method of controlling a printing apparatus, wherein the printing apparatus comprising:
    a printing unit that prints an image based on an image of an original, on a sheet;
    a discharge unit that discharges the sheet on which an image is printed by the printing unit in a face-down manner in which a printed surface of the sheet is downward or in a face-up manner in which the printed surface of the sheet is upward;

a first binding unit that is able to move to a plurality of positions and performs a first binding process using a staple at any one of two corner positions of a trailing edge side, in a conveyance direction of the sheets, of the sheet bundle stacked on a tray; and a second binding unit that performs a second binding process without a staple at a single corner position of the trailing edge side, in the conveyance direction of the sheets, of the sheet bundle stacked on the tray;

the method comprising:

selecting one of the first binding process and the second binding process as a binding process to be performed;

selecting a corner position of sheet bundle on which the binding process is to be performed, the corner position including a first corner position and a second corner position that is not diagonally opposite to the first corner position;

in a case that an orientation of the sheet is the same as an orientation of the original and the first binding process is selected but the second binding process is not selected in the selecting, determining to discharge the plurality of sheets to be discharged on the tray regardless of whether a selection of the first corner position of the sheet bundle or the second corner position of the sheet bundle, and controlling the discharge unit to discharge the plurality of sheets in the face-down manner, and in a case that an orientation of the sheet is the same as an orientation of the original and the second binding process is selected but the first binding process is not selected in the selecting, determining to discharge the plurality of sheets on the tray in the face-down manner or in the face-up manner based on a selection of whether the first corner position of the sheet bundle or the second corner position of the sheet bundle in the selecting and controlling the discharge unit to discharge the plurality of sheets in accordance with a determined result.

15. A non-transitory computer-readable storage medium storing a program for causing a computer to execute a method of controlling a printing apparatus, wherein the printing apparatus comprising:

a printing unit that prints an image based on an image of an original, on a sheet;

a discharge unit that discharges the sheet on which an image is printed by the printing unit in a face-down manner in which a printed surface of the sheet is downward or in a face-up manner in which the printed surface of the sheet is upward;

a first binding unit that is able to move to a plurality of positions and performs a first binding process using a staple at any one of two corner positions of a trailing edge side, in a conveyance direction of the sheets, of the sheet bundle stacked on a tray; and a second binding unit that performs a second binding process without a staple at a single corner position of the trailing edge side, in the conveyance direction of the sheets, of the sheet bundle stacked on the tray;

the method comprising:

selecting one of the first binding process and the second binding process as a binding process to be performed;

selecting a corner position of sheet bundle on which the binding process is to be performed, the corner position including a first corner position and a second corner position that is not diagonally opposite to the first corner position;

in a case that an orientation of the sheet is the same as an orientation of the original and the first binding process is selected but the second binding process is not selected in the selecting, determining to discharge the plurality of sheets to be discharged on the tray regardless of whether a selection of the first corner position of the sheet bundle or the second corner position of the sheet bundle, and controlling the discharge unit to discharge the plurality of sheets in the face-down manner, and in a case that an orientation of the sheet is the same as an orientation of the original and the second binding process is selected but the first binding process is not selected in the selecting, determining to discharge the plurality of sheets on the tray in the face-down manner or in the face-up manner based on a selection of whether the first corner position of the sheet bundle or the second corner position of the sheet bundle in the selecting and controlling the discharge unit to discharge the plurality of sheets in accordance with a determined result.

16. A printing apparatus capable of connecting to a finisher that performs a binding process of sheets, wherein the finisher comprising:

a tray that stacks a plurality of sheets discharged from the printing apparatus as a sheet bundle;

a first binding unit that is able to move to a plurality of positions and performs a first binding process using a staple at any one of two corner positions of a trailing edge side, in a conveyance direction of the sheets, of the sheet bundle stacked on the tray; and a second binding unit that performs a second binding process without a staple at a single corner position of the trailing edge side, in the conveyance direction of the sheets, of the sheet bundle stacked on the tray, and wherein the printing apparatus comprising;

a printing unit that prints an image based on an image of an original, on a sheet;

a discharge unit that discharges a sheet on which an image is printed by the printing unit in a face-down manner in which a printed surface of the sheet is downward or in a face-up manner in which the printed surface of the sheet is upward;

a first selector configured to select one of the first binding process and the second binding process as a binding process to be performed;

a second selector configured to select a corner position of a sheet bundle on which the binding process is to be performed, the corner position including a first corner position and a second corner position that is not diagonally opposite to the first corner position; and a controller that, (i) in a case that an orientation of the sheet is the same as an orientation of the original and the first binding process is selected but the second binding process is not selected by the first selector, determines to discharge the plurality of sheets to be discharged on the tray regardless of whether the second selector selects the first corner position of the sheet bundle or the second corner position of the sheet bundle, and controls the discharge unit to discharge the plurality of sheets in the face-down manner, and (ii) in a case that an orientation of the sheet is the same as an orientation of the original and the second binding process is selected but the first binding process is not selected by the first selector, determines to discharge the plurality of sheets on the tray in the face-down manner or in the face-up manner based on whether by the second selector selects the first corner position of the sheet bundle or the second corner position of the sheet bundle, and controls the discharge unit to discharge the plurality of sheets in accordance with a determined result.

\* \* \* \* \*